(12) United States Patent
Buri et al.

(10) Patent No.: US 9,328,222 B2
(45) Date of Patent: May 3, 2016

(54) HIGH SOLIDS AQUEOUS MINERAL AND/OR FILLER AND/OR PIGMENT SUSPENSION IN ACIDIC PH ENVIRONMENT

(71) Applicant: Omya International AG, Oftringen (CH)

(72) Inventors: Matthias Buri, Rothrist (CH); Samuel Rentsch, Aarburg (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/406,585

(22) PCT Filed: Jun. 7, 2013

(86) PCT No.: PCT/EP2013/061800
§ 371 (c)(1),
(2) Date: Dec. 9, 2014

(87) PCT Pub. No.: WO2014/001063
PCT Pub. Date: Jan. 3, 2014

(65) Prior Publication Data
US 2015/0315366 A1    Nov. 5, 2015

Related U.S. Application Data

(60) Provisional application No. 61/667,027, filed on Jul. 2, 2012.

(30) Foreign Application Priority Data

Jun. 28, 2012    (EP) .................................. 12174196

(51) Int. Cl.
*C08K 9/04* (2006.01)
*D21H 17/00* (2006.01)
*C08K 3/16* (2006.01)
*C08K 3/28* (2006.01)
*C08K 5/092* (2006.01)
*C08L 29/04* (2006.01)
*C09C 1/02* (2006.01)
*D21H 17/66* (2006.01)
*D21H 17/67* (2006.01)
*D21H 17/69* (2006.01)
*D21H 19/38* (2006.01)
*B41M 5/52* (2006.01)

(52) U.S. Cl.
CPC .. *C08K 9/04* (2013.01); *B41M 5/52* (2013.01); *C08K 3/16* (2013.01); *C08K 3/28* (2013.01); *C08K 5/092* (2013.01); *C08L 29/04* (2013.01); *C09C 1/021* (2013.01); *D21H 17/66* (2013.01); *D21H 17/675* (2013.01); *D21H 17/69* (2013.01); *D21H 17/74* (2013.01); *D21H 19/385* (2013.01); *B41M 5/5218* (2013.01); *B41M 5/5236* (2013.01); *B41M 5/5254* (2013.01); *C01P 2004/62* (2013.01); *C01P 2006/12* (2013.01); *C01P 2006/22* (2013.01); *C01P 2006/40* (2013.01); *C08K 2003/162* (2013.01)

(58) Field of Classification Search
CPC .................................. D21H 17/00; C09C 1/02
USPC ...................................................... 162/164.1
See application file for complete search history.

(56) References Cited

U.S. PATENT DOCUMENTS

| | | | |
|---|---|---|---|
| 4,219,590 A | 8/1980 | Shibazaki et al. | |
| 4,367,207 A | 1/1983 | Vanderheiden | |
| 5,043,017 A | 8/1991 | Passaretti | |
| 5,164,006 A | 11/1992 | Chapnerkar et al. | |
| 5,230,734 A | 7/1993 | Kumasaka et al. | |
| 6,387,176 B1 | 5/2002 | Widmer et al. | |
| 6,777,517 B1 | 8/2004 | Albrecht et al. | |
| 6,946,510 B2 | 9/2005 | Suau et al. | |
| 7,514,488 B2 | 4/2009 | Gane et al. | |
| 8,129,028 B2 | 3/2012 | Plehiers et al. | |
| 8,721,838 B2 | 5/2014 | Buri et al. | |
| 2009/0199741 A1 | 8/2009 | Bleibler et al. | |
| 2010/0086987 A1* | 4/2010 | Gane | B01J 20/043 435/243 |
| 2013/0323489 A1* | 12/2013 | Gane | C09C 1/02 428/219 |
| 2014/0213711 A1 | 7/2014 | Buri et al. | |

FOREIGN PATENT DOCUMENTS

| | | | |
|---|---|---|---|
| EP | 0406662 A1 | 1/1991 | |
| EP | 0736553 A2 | 10/1996 | |
| EP | 1138697 A1 | 4/2001 | |
| EP | 1136508 A1 | 9/2001 | |

(Continued)

OTHER PUBLICATIONS

International Search Report, dated Sep. 3, 2013 for PCT Application No. PCT/EP2013/061800.
Written Opinion of the International Searching Authority, dated Sep. 3, 2013 for PCT Application No. PCT/EP2013/061800.
English translation of Examination Report for Taiwan Patent Application No. TW102120231, 8 pages, Search Report dated Nov. 11, 2014.

*Primary Examiner* — Mark Halpern
(74) *Attorney, Agent, or Firm* — Amster, Rothstein & Ebenstein LLP

(57) ABSTRACT

The present invention relates to high solids aqueous mineral and/or filler and/or pigment suspensions in acidic pH environment, to a method for producing such high solids aqueous mineral and/or filler and/or pigment suspension to the use of the high solids aqueous mineral and/or filler and/or pigment suspension in paper making, paper coating, plastic, agricultural and/or paint applications and as filler in paper and to a coating color formulation comprising the high solids aqueous mineral and/or filler and/or pigment suspension.

56 Claims, No Drawings

(56) References Cited

FOREIGN PATENT DOCUMENTS

| | | | |
|---|---|---|---|
| EP | 1982759 | A1 | 10/2008 |
| EP | 2264108 | A1 | 12/2010 |
| EP | 2264109 | A1 | 12/2010 |
| TW | 201141963 | A1 | 12/2011 |
| WO | 9632448 | A1 | 10/1996 |
| WO | 9632449 | A1 | 10/1996 |
| WO | 9708247 | A1 | 3/1997 |
| WO | 9714847 | A1 | 4/1997 |
| WO | 9820079 | A1 | 5/1998 |
| WO | 0077058 | A1 | 12/2000 |
| WO | 2008003695 | A1 | 1/2008 |

* cited by examiner

HIGH SOLIDS AQUEOUS MINERAL AND/OR FILLER AND/OR PIGMENT SUSPENSION IN ACIDIC PH ENVIRONMENT

CROSS-REFERENCE TO RELATED APPLICATIONS

This application is a U.S. national phase of PCT Application No. PCT/EP2013/061800, filed Jun. 7, 2013, which claims priority to European Application No. 12174196.1, filed Jun. 28, 2012 and U.S. Provisional Application No. 61/667,027, filed Jul. 2, 2012.

The present invention relates to high solids aqueous mineral and/or filler and/or pigment suspensions in acidic pH environment, to a method for producing such high solids aqueous mineral and/or filler and/or pigment suspension, to the use of the high solids aqueous mineral and/or filler and/or pigment suspension in paper making, paper coating, plastic, agricultural and/or paint applications and as filler in paper and to a coating color formulation comprising the high solids aqueous mineral and/or filler and/or pigment suspension.

In practice, aqueous preparations and especially suspensions of water-insoluble solids such as calcium carbonate containing materials are used extensively in the paper, paint, rubber and plastics industries as coatings, fillers, extenders and pigments for papermaking as well as lacquers and paints. For example, suspensions, also called slurries of calcium carbonate, talc or kaolin are used in the paper industry in large amounts as filler and/or as a component in the preparation of coated paper. Typical aqueous preparations of water-insoluble solids are characterized in that they comprise water, a water-insoluble dispersed solid compound and optionally further additives in the form of a suspension or slurry.

One problem in this regard resides in the fact that the adjustment of suitable mechanical properties for such aqueous suspensions is still a challenge under certain conditions. Since the transport of suspensions of calcium carbonate should be economically viable, the quantity of water in the suspension or the volume of the suspension should be as small as possible. However, especially at low temperatures such as typically reached in winter time the mechanical properties of such high solids aqueous suspensions significantly worsen due to a freezing of the suspension which makes the transport and further handling difficult.

In addition thereto, high solids aqueous suspensions comprising calcium carbonate containing material tend to be instable under acidic conditions such as in the presence of e.g. acidic additives which can be typically part of such aqueous suspension and, thus, result in worsen mechanical properties over time.

In this regard, several approaches for improving the mechanical properties of aqueous suspensions comprising calcium carbonate containing material have been proposed. For example, WO 96/32448 describes a process for the processing of a dispersion of calcium carbonate (known in the industry as a "slurry") with a low concentration of carbonate (1 to 30% of solid matter) using polyDIMDAC (dimethyldiallyl ammonium homopolymer), which is a cationic aggregating agent of low molecular weight from 10,000 to 500,000, in order to obtain bulk. This patent uses both PCC and ground natural calcium carbonate, referred to as "G(N)CC" or ground natural calcium carbonate, or mixtures thereof. This process is mainly one of flocculation, an aggregation of small particles onto larger ones and the property of interaction with the fibres is principally obtained by the exclusively coarse granulometry of the particles. The physical properties of the paper are then unfavourably affected when its weight diminishes.

WO 96/32449 provides broadly the same information. The aim is to obtain a selective aggregation of fine and ultra-fine particles, using an aggregating agent presenting a charge opposed to the overall charge of the filler.

U.S. Pat. No. 4,367,207 describes a process for treating $CaCO_3$ in the presence of an anionic organopolyphosphonate electrolyte, but the aim is simply to obtain a suspension of finely-divided carbonate.

EP 0 406 662 describes a process for manufacturing synthetic carbonate in which a pre-mix is made of $CaCO_3$ in aragonitic form with lime; to this slurry is added a "phosphoric acid derivative" such as phosphoric acid or its salts or various phosphates, and finally $CO_2$ is introduced in order to effect conventional carbonation. The purpose of this patent is specifically to obtain a PCC with a large particle size and a particular crystalline form (acicular), the industrial manufacture of which was not previously possible.

Phosphoric acid is used in EP 0 406 662 in order to produce specifically the aragonitic form via an unidentified "phosphoric acid calcium" which provides new nucleation seeds for the required crystalline form. The carbonate products obtained are useful in paper manufacture to allow the incorporation of greater quantities of mineral matter into the paper, producing incombustible interior papers. No properties such as the opacity, gloss or bulk of the paper are mentioned. Furthermore, the only application example concerns a carbonate/resin compound.

Processes are also known for giving particular properties to the carbonate-containing material.

We shall mention among others the obtaining of properties of resistance to acids, which are useful when the carbonate is employed as a filler in acidic paper-making processes, which are some of the traditional paper manufacture procedures. Thus, U.S. Pat. No. 5,043,017 describes the stabilisation of calcium carbonate, and in particular of PCC by the action of a calcium-chelating agent such as calcium hexametaphosphate, and an associated base which can be an alkaline metal salt of a weak acid (phosphoric, citric, boric, acetic acid etc.).

U.S. Pat. No. 4,219,590 describes a process for improving dry calcium carbonate by its treatment with a "totally dry anhydride gas".

Herein, the improvement of the surface treatment is effected by a fatty acid or an acid resin or similar products. This process treats the carbonate by boil-off vapours of phosphoric, hydrochloric, nitric, capric or acrylic acid or chlorides or fluorides of aluminum, or of fumaric acid etc. The aim is to split the carbonate particles into fine particles.

U.S. Pat. No. 5,230,734 is also known, which uses $CO_2$ to produce a Ca—Mg carbonate. WO 97/08247 describes a carbonate formulation, also for paper, obtained by a weak acid method. The carbonate is treated with a mixture of a weak acid and weak base, those being phosphoric acid and a derivative of an organic acid, respectively. WO 97/14847 also describes a carbonate resistant to acids, for paper, which is treated with a mixture of two weak acids in order to "deactivate" the surface of the carbonate.

WO 98/20079 also describes a process for rendering a carbonate resistant to acids, and in particular a PCC, by adding calcium silicate and a weak acid or alum. U.S. Pat. No. 5,164,006 uses a treatment by $CO_2$ in order to obtain properties of resistance to an acid medium. However, the addition of products such as zinc chloride is then necessary, which does not meet environmental standards.

As already mentioned above, the aqueous suspensions typically comprise water, a water-insoluble dispersed solid compound and optionally further additives in such preparations. In this regard, it should be further noted that such dispersed calcium carbonate comprising aqueous suspensions in combination with calcium chloride can cause serious problems during e.g. the production of such suspension the production of a coating colour composition, its storage, and subsequent use. If such a calcium carbonate comprising aqueous suspension comes in contact with calcium chloride or other salts of monovalent, divalent or trivalent cations, the formation of agglomerated and flocculated particles in the aqueous suspension occurs which may lead to unwanted effects such as a severe worsen of mechanical properties and/or partial dissolution of acid sensitive material in the composition.

This problem is getting worse with increasing content of calcium carbonate and/or calcium chloride in the aqueous composition, and is especially pronounced in calcium carbonate comprising aqueous compositions having high solids content, i.e. compositions having solids content of more than 50 wt.-% based on the total weight of the composition.

Therefore, there is a continuous need for alternative high solids aqueous mineral and/or filler and/or pigment suspensions which provide a better performance than existing high solids aqueous mineral and/or filler and/or pigment suspensions and effectively maintain the mechanical properties of a suspension at low temperature and/or in acidic environment.

Accordingly, it is an objective of the present invention to provide an aqueous mineral and/or filler and/or pigment suspensions having high solids content. A further objective of the present invention is to provide a high solids aqueous mineral and/or filler and/or pigment suspension in which the formation of agglomerated and flocculated particles in the suspension is reduced or prevented in pH acidic environment and thus maintains sufficient mechanical properties for such suspension. Another objective of the present invention is to provide a high solids aqueous mineral and/or filler and/or pigment suspension being stable in pH acidic environment, i.e. maintains sufficient mechanical properties, over a period of at least 24 hours. An even further objective is to provide a high solids aqueous mineral and/or filler and/or pigment suspension having sufficient mechanical properties at temperatures of about −5° C. and even below, i.e. said suspension does not freeze under such conditions. A still further objective is to provide a high solids aqueous mineral and/or filler and/or pigment suspension which does not affect the other physical properties of the suspension, such as optical properties, in an unacceptable way. Another objective is to provide a high solids aqueous mineral and/or filler and/or pigment suspension having an acidic pH in the presence of calcium carbonate particles over a period of at least 24 hours, preferably over a period of at least 1 week and most preferably over a period of at least 1 month at a storage temperature between −5° C. to +23° C.

The foregoing and other objectives are solved by a high solids aqueous mineral and/or filler and/or pigment suspension in acidic pH environment comprising:
a) at least one calcium carbonate-containing material comprising calcium carbonate-containing particles, and
b) at least one salt of at least one strong acid, wherein the at least one strong acid forming the at least one salt of at least one strong acid is selected from the group consisting of acids having a $pK_a$ value of less than or equal to zero at +23° C., wherein the high solids aqueous suspension has
i) a solids content of at least 50 wt.-%, based on the total weight of the high solids aqueous suspension,
ii) a Brookfield viscosity at 100 rpm of ≤1 000 mPas at a temperature of −5° C.,
iii) a pH of <6 at +23° C., and
iv) a conductivity of between 10 and 100 mS/cm at −5° C. and at +23° C.

The inventors surprisingly found that the foregoing high solids aqueous mineral and/or filler and/or pigment suspension according to the present invention leads to a suspension in which the formation of agglomerated and flocculated particles in the suspension is reduced or prevented in pH acidic environment and thus maintains sufficient mechanical properties for such suspension and, furthermore, provides for a stability in acidic environment over a period of at least 24 hours. It was further observed that the high solids aqueous mineral and/or filler and/or pigment suspension has an acidic pH in the presence of calcium carbonate particles over a period of at least 24 hours at a storage temperature between −5° C. to +23° C. Furthermore, the inventors found out that the high solids aqueous mineral and/or filler and/or pigment suspension does not freeze at temperatures of about −5° C. and even below and does not affect the other properties of the suspension, such as the optical properties, in an unacceptable way. In particular, this is achieved by the use of a combination of at least one calcium carbonate-containing material and at least one salt of at least one strong acid in a high solids aqueous mineral and/or filler and/or pigment suspension having solids content of at least 50 wt.-% based on the total weight of the high solids aqueous suspension. Thus, the instant high solids aqueous mineral and/or filler and/or pigment suspension enables the provision of a high solids aqueous suspension being stable in acidic environment.

It should be understood that for the purposes of the present invention, the following terms have the following meaning:

For the purpose of the present invention, the term "suspension" or "slurry" comprises insoluble solids and water and optionally further additives and usually contains large amounts of solids and, thus, is more viscous and generally of higher density than the liquid from which it is formed.

The term "pH acidic environment" in the meaning of the present invention refers to a high solids aqueous mineral and/or filler and/or pigment suspensions having a pH of <6 at +23° C.

The term "calcium carbonate-containing material" in the meaning of the present invention refers to a material that comprises "calcium carbonate-containing particles", at least one "comb polymer" and optionally at least one salt of at least one strong acid. Accordingly, the "calcium carbonate-containing material" corresponds to the total dry weight of solid material in the high solids aqueous mineral and/or filler and/or pigment suspension.

The term "calcium carbonate-containing particles" refers to a material that comprises at least 50 wt.-% calcium carbonate, based on the total dry weight of the calcium carbonate-containing particles.

In the meaning of the present invention, the term "comb polymer" refers to a comb-shaped polymer which is formed from a main chain, also referred to as back bone, to which carbonic acid groups and/or other acid groups are attached in the form of free acids or salts thereof, i.e. in a form of a carboxylate ion, as well as side chains comprising polyalkylene oxide, optionally end-capped with a hydrocarbon chain. The polyalkylene oxide side chains can be bonded to the main chain via ester bonds, amide bonds, or ether bonds. In addition to the carbonic acid groups and the polyalkylene oxide side chains, further functional or non-functional groups can be bonded to the main chain, e.g. positively charged functional groups such as amine, amide and/or quaternary ammonium groups.

The term "acid" in the present invention is defined according to the Brønsted-Lowry definition. In other words, an acid is defined as a substance that can act as proton donor. This means, that for example, the term "$HSO_4^-$" also exemplifies an acid.

For the purposes of the present invention, the term "viscosity" refers to Brookfield viscosity. According to the present invention the Brookfield viscosity is measured using a RVT model Brookfield™ viscometer at a temperature of +23° C. and −5° C., and a rotation speed of 100 rpm (revolutions per minute) with the appropriate disc spindle No 1 to 5. The reported viscosity values are the values detected by the instrument after 1 minute of measurement. Before measuring the Brookfield viscosity the suspension was stirred for 5 minutes using a Pendraulik laboratory dissolver, 0.25-2.5 kW, mechanically adjustable up to 8400 rpm with an appropriate tooth disc stirrer.

"Conductivity" according to the present invention shall mean the electrical conductivity of an aqueous carbonate-comprising material suspension as measured according to the measurement method defined in the examples section here below. The conductivity is specified in mS/cm and may be measured at −5° C. and at +23° C.

According to another aspect of the present invention, a method for producing a high solids aqueous mineral and/or filler and/or pigment suspension is provided, comprising the steps of
  a) providing an aqueous suspension comprising at least one calcium carbonate-containing material, wherein the calcium carbonate-containing material has a charge density of between +2 and −2 C/g at pH 9,
  b) providing
    i) at least one strong acid selected from the group consisting of acids having a $pK_a$ value of less than or equal to zero at +23° C., and/or
    ii) at least one salt of at least one strong acid, wherein the at least one strong acid forming the at least one salt of at least one strong acid is selected from the group consisting of acids having a $pK_a$ value of less than or equal to zero at +23° C.,
  c) adding the at least one strong acid and/or the at least one salt of at least one strong acid of step b) to the aqueous suspension comprising at least one calcium carbonate-containing material of step a),
  d) optionally grinding the aqueous suspension comprising at least one calcium carbonate-containing material of step a) before and/or during and/or after step c),
  wherein the high solids aqueous suspension after step c) and/or d) has
  i) a solids content of at least 50 wt.-%, based on the total weight of the high solids aqueous suspension,
  ii) a Brookfield viscosity at 100 rpm of ≤1 000 mPas at a temperature of −5° C.,
  iii) a pH of <6 at +23° C., and
  iv) a conductivity of between 10 and 100 mS/cm at −5° C. and at +23° C.

It is preferred that the method further comprises step e) of providing at least one medium strong acid selected from the group consisting of acids having a $pK_a$ value of between 0 and 2.5 at +23° C., preferably the at least one medium strong acid is selected from $H_2SO_3$, $HSO_4^-$, $H_3PO_4$, oxalic acid and mixtures thereof, and/or at least one weak acid selected from the group consisting of acids having a $pK_a$ value of between >2.5 to 6 at +23° C., preferably the at least one weak acid is selected from citric acid and/or tartaric acid. It is also preferred that the method further comprises step f) of contacting the aqueous suspension comprising at least one calcium carbonate-containing material of step a) with the at least one medium strong acid and/or at least one weak acid of step e) during and/or after step c), and/or during and/or after optional step d). It is further preferred that step c) and/or step d) and/or step f) is carried out at a temperature of between −5° C. and +99° C., preferably between +20° C. and +85° C. and most preferably between +20° C. and +50° C. and most preferably between +50° C. and +85° C. It is also preferred that the method further comprises step g) of concentrating the obtained high solids aqueous mineral and/or filler and/or pigment suspension. It is also preferred that the method further comprises drying the obtained high solids aqueous mineral and/or filler and/or pigment suspension.

According to a further aspect of the present invention, a calcium carbonate-containing material obtainable by drying the high solids aqueous mineral and/or filler and/or pigment suspension is provided. According to still another aspect of the present invention, the use of the high solids aqueous mineral and/or filler and/or pigment suspension and/or the calcium carbonate-containing material in paper making, paper coating, plastic, agricultural and/or paint applications is provided. According to a still further aspect of the present invention, the use of the high solids aqueous mineral and/or filler and/or pigment suspension and/or the calcium carbonate-containing material as filler in paper is provided. It is preferred that the high solids aqueous mineral and/or filler and/or pigment suspension and/or the calcium carbonate-containing material is used as a support for digital printing, preferred ink jet printing, or for flexo, rotogravure and/or offset printing, most preferably for black ink printing in inkjet printing.

According to a further aspect of the present invention, a coating color formulation comprising the high solids aqueous mineral and/or filler and/or pigment suspension and/or the calcium carbonate-containing material and a natural and/or synthetic binder is provided, the binder preferably consisting of styrene-butadiene, styrene-acrylate, polyvinyl acetate, polyvinyl alcohol, starch or mixtures thereof, and most preferably the binder contains or consists of polyvinyl alcohol.

Advantageous embodiments of the present invention are defined in the corresponding sub-claims.

According to one embodiment of the present invention, the calcium carbonate-containing particles of the at least one calcium carbonate-containing material are selected from among natural calcium carbonate, precipitated calcium carbonate or mixtures thereof.

According to another embodiment of the present invention, the calcium carbonate-containing particles of the at least one calcium carbonate-containing material have a weight median particle size $d_{50}$ from 0.1 to 50 μm, preferably from 0.25 to 50 μm, more preferably from 0.3 to 5 μm, and most preferably from 0.4 to 3 μm.

According to yet another embodiment of the present invention, the calcium carbonate-containing particles of the at least one calcium carbonate-containing material have a specific surface area of from 0.1 $m^2$/g to 200 $m^2$/g, preferably from 0.1 $m^2$/g to 50 $m^2$/g and more preferably from 0.1 $m^2$/g to 20 $m^2$/g, measured using nitrogen and the BET method.

According to one embodiment of the present invention, the high solids aqueous suspension comprises the at least one calcium carbonate-containing material in an amount of at least 50 wt.-%, preferably from 50 to 82 wt.-%, more preferably from 55 to 82 wt.-%, even more preferably from 60 to 78 wt.-% and most preferably from 65 to 78 wt.-%, based on the total weight of the high solids aqueous suspension.

According to another embodiment of the present invention, the at least one calcium carbonate-containing material comprises at least one comb polymer, preferably the surface of the calcium carbonate-containing particles of the at least one calcium carbonate-containing material are coated with the at least one comb polymer.

According to yet another embodiment of the present invention, the at least one calcium carbonate-containing material comprises at least one comb polymer having an intrinsic viscosity in the range of 5 to 99 ml/g, preferably in the range of 10 to 80 ml/g and most preferably in the range of 10 to 50 ml/g.

According to one embodiment of the present invention, the at least one salt of at least one strong acid comprises a divalent and/or trivalent cation, preferably the divalent cation is selected from the group consisting of calcium, magnesium, strontium and mixtures thereof and/or the trivalent cation preferably is aluminum.

According to another embodiment of the present invention, the at least one strong acid forming the at least one salt of at least one strong acid is selected from the group consisting of hydrochloric acid, nitric acid and mixtures thereof.

According to yet another embodiment of the present invention, the high solids aqueous suspension comprises at least one comb polymer in an amount from 0.01 to 5 wt.-%, based on the total dry weight of the calcium carbonate-containing material in the suspension, preferably from 0.05 to 4 wt.-%, more preferably from 0.1 to 3 wt.-%, even more preferably from 0.2 to 2 wt.-%, and most preferably from 0.25 to 1.5 wt.-% or from 0.5 to 1.25 wt.-%.

According to one embodiment of the present invention, the high solids aqueous suspension has solids content from 50 to 82 wt.-%, preferably from 55 to 82 wt.-%, more preferably from 60 to 78 wt.-% and most preferably from 65 to 78 wt.-%, based on the total weight of the high solids aqueous suspension.

According to another embodiment of the present invention, the high solids aqueous suspension has a Brookfield viscosity at 100 rpm from 25 to 1 000 mPas at a temperature of −5° C., preferably from 25 to 700 mPas at −5° C., more preferably from 25 to 500 mPas at −5° C. and most preferably from 50 to 300 mPas at −5° C.

According to yet another embodiment of the present invention, the high solids aqueous suspension has a pH of between 4 and <6 at +23° C., preferably a pH of between 4.5 and <6 at +23° C. and preferably a pH of between 5 and <6 at +23° C.

According to one embodiment of the present invention, the high solids aqueous suspension has a conductivity of between 20 mS/cm and 100 mS/cm measured at −5° C. and +23° C. and preferably between 30 mS/cm and 100 mS/cm measured at −5° C. and +23° C.

According to another embodiment of the present invention, the high solids aqueous suspension further comprises at least one reaction product or products of the at least one calcium carbonate-containing material with at least one medium strong acid and/or at least one reaction product or products of the at least one calcium carbonate-containing material with at least one weak acid. It is preferred that the at least one medium strong acid forming the at least one reaction product or products of the at least one calcium carbonate-containing material is selected from the group consisting of acids having a $pK_a$ value of between 0 and 2.5 at +23° C., preferably the at least one medium strong acid is selected from $H_2SO_3$, $HSO_4-$, $H_3PO_4$, oxalic acid and mixtures thereof. It is noted that $HSO_4-$ can be added in the form of the alkali or earth alkali salt, and preferably in the form of the Na, Li, K, Mg, and Ca salt. It is further preferred that the at least one weak acid forming the at least one reaction product or products of the at least one calcium carbonate-containing material is selected from the group consisting of acids having a $pK_a$ value of between >2.5 and 6 at +23° C., preferably the at least one weak acid is selected from citric acid, tartaric acid and mixtures thereof.

According to yet another embodiment of the present invention, the molar quantity of the sum, expressed by the generated $H_3O^+$ ions, of the at least one medium strong acid forming the at least one reaction product or products of the at least one calcium carbonate-containing material and/or the at least one weak acid forming the at least one reaction product or products of the at least one calcium carbonate-containing material and the at least one strong acid forming the at least one salt of at least one strong acid relative to the quantity of moles of $CaCO_3$ is in total between 0.01 and 1.9.

According to one embodiment of the present invention, the high solids aqueous suspension further comprises aluminum hydroxide and/or magnesium hydroxide.

According to another embodiment of the present invention, the high solids aqueous suspension has a positive charge density at pH 5, preferably of at least +0.1 C/g at pH 5, more preferably of at least +0.5 C/g at pH 5, even more preferably of at least +1 C/g at pH 5 and most preferably of at least +1.5 C/g at pH 5.

In the following, it is referred to further details of the present invention and especially the foregoing components of the high solids aqueous mineral and/or filler and/or pigment suspension.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

One specific requirement of the present invention is that the high solids aqueous mineral and/or filler and/or pigment suspension in acidic pH environment comprises at least one calcium carbonate-containing material. In particular, the at least one calcium carbonate-containing material comprises calcium carbonate-containing particles.

According to one embodiment of the present invention, the calcium carbonate-containing particles being part of the at least one calcium carbonate-containing material are selected from among natural calcium carbonate, precipitated calcium carbonate or mixtures thereof.

"Ground calcium carbonate" (GCC) in the meaning of the present invention is a calcium carbonate obtained from natural sources, such as limestone, marble, calcite, dolomite or chalk, and processed through a wet and/or dry treatment such as grinding, screening and/or fractionating, for example by a cyclone or classifier.

A ground calcium carbonate (GCC) may feature, e.g. one or more of marble, limestone, chalk, and/or dolomite. According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-containing particles comprise wet ground calcium carbonate-containing particles, the grinding step may be performed under conditions such that autogenous grinding takes place and/or by horizontal ball milling, and/or other such processes known to the skilled man. The wet processed ground calcium carbonate-containing particles thus obtained may be washed and dewatered by well known processes, e.g. by flocculation, filtration or forced evaporation prior to drying. The subsequent step of drying may be carried out in a single step such as spray drying, or in at least two steps. It is also common that such calcium carbonate-containing particles undergo a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water.

A precipitated calcium carbonate (PCC) may feature, e.g. one or more of aragonitic, vateritic and/or calcitic mineralogical morphological forms. The aragonitic morphology is commonly in the acicular form, whereas vateritic morphology belongs to the hexagonal crystal system. The calcitic morphology can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

It is preferred that the calcium carbonate-containing particles comprise ground calcium carbonate (GCC). For example, the calcium carbonate-containing particles comprise one ground calcium carbonate (GCC). Alternatively, the calcium carbonate-containing particles comprise a mixture of two or more ground calcium carbonates (GCC) selected from different sources of ground calcium carbonate. For example, the calcium carbonate-containing particles comprise one ground calcium carbonate (GCC) selected from dolomite and one ground calcium carbonate (GCC) selected from marble.

In one preferred embodiment of the present invention, the calcium carbonate-containing particles comprise a mixture of ground calcium carbonate and a precipitated calcium carbonate.

In addition to calcium carbonate, the calcium carbonate-containing particles may comprise further metal oxides such as titanium dioxide and/or aluminium trioxide, metal hydroxides such as aluminium tri-hydroxide and/or magnesium hydroxide, metal salts such as sulfates, silicates such as talc and/or kaolin clay and/or mica, carbonates such as magnesium carbonate and/or gypsum, satin white and mixtures thereof.

According to one embodiment of the present invention, the amount of calcium carbonate in the calcium carbonate-containing particles being part of the at least one calcium carbonate-containing material is at least 50 wt.-%, e.g. at least 60 wt.-%, preferably between 50 and 100 wt.-%, more preferably between 60 and 99 wt.-% and most preferably between 70 and 98 wt.-%, based on the total dry weight of the calcium carbonate-containing particles.

According to one embodiment of the present invention, the amount of calcium carbonate-containing particles in the at least one calcium carbonate-containing material is at least 50 wt.-%, preferably at least 75 wt.-%, more preferably at least 80 wt.-%, and most preferably at least 88 wt.-% or at least 99.9 wt.-%, based on the total dry weight of the calcium carbonate-containing material. For example, the amount of calcium carbonate-containing particles in the at least one calcium carbonate-containing material is between 85 wt.-% and 99.9 wt.-%, based on the total dry weight of the calcium carbonate-containing material.

Additionally or alternatively, the high solids aqueous mineral and/or filler and/or pigment suspension comprises the at least one calcium carbonate-containing material in an amount of at least 50 wt.-%, preferably from 50 to 82 wt.-%, more preferably from 55 to 82 wt.-%, even more preferably from 60 to 78 wt.-% and most preferably from 65 to 78 wt.-%, based on the total weight of the high solids aqueous suspension.

According to one embodiment of the present invention, the calcium carbonate-containing particles of the at least one calcium carbonate-containing material have a weight median particle size $d_{50}$ from 0.1 to 50 µm, preferably from 0.25 to 50 µm, more preferably from 0.3 to 5 µm, and most preferably from 0.4 to 3 µm, as measured by Sedigraph 5120.

For example, the calcium carbonate-containing particles of the at least one calcium carbonate-containing material have a weight median particle size $d_{50}$ from 0.4 to 0.3 µm or from 0.4 to 2.0 µm, as measured by Sedigraph 5120.

Throughout the present document, the "particle size" of the calcium carbonate-containing particles is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.4 and 2 µm, a Sedigraph 5120 device from the company Micromeritics, USA, can be used. For measuring the size distribution and weight median diameter $d_{50}$ by the Sedigraph, the samples were pre-diluted to the right concentration by using deionized water but no further additives, such as usually added dispersants like polyphosphate or polyacrylate.

Additionally or alternatively, the fraction of the calcium carbonate-containing particles of the at least one calcium carbonate-containing material having a particle size of less than 2 µm is greater than 60 wt.-%, preferably greater than 70 wt.-%, more preferably greater than 80 wt.-%, still more preferably greater than 85 wt.-% and most preferably about 90 wt.-%, based on the total weight of the at least one calcium carbonate-containing particles, as measured with a Sedigraph 5120.

For example, the fraction of the calcium carbonate-containing particles having a particle size of less than 0.2 µm is greater than 5 wt.-%, preferably greater than 7.5 wt.-%, more preferably greater than 10 wt.-%, still more preferably greater than 12.5 wt.-% and most preferably about 16 wt.-%, based on the total weight of the at least one calcium carbonate-containing particles, as measured with a Sedigraph 5120.

According to one embodiment of the present invention, the calcium carbonate-containing particles of the at least one calcium carbonate-containing material have a specific surface area of from 0.1 m$^2$/g to 200 m$^2$/g, preferably from 0.1 m$^2$/g to 50 m$^2$/g and more preferably from 0.1 m$^2$/g to 20 m$^2$/g, measured using nitrogen and the BET method.

For example, the calcium carbonate-containing particles are marble having a specific surface area of from 0.1 m$^2$/g to 200 m$^2$/g, preferably from 0.1 m$^2$/g to 50 m$^2$/g and more preferably from 0.1 m$^2$/g to 20 m$^2$/g, measured using nitrogen and the BET method and a weight median particle size d$_{50}$ from 0.1 to 50 μm, from 0.25 to 50 μm, or from 0.3 to 5 μm, preferably from 0.4 to 3 μm, as measured by Sedigraph 5120.

A further requirement of the present invention is that the calcium carbonate-containing material used for preparing the high solids aqueous mineral and/or filler and/or pigment suspension has a charge density of between +2 and −2 C/g at pH 9.

In one embodiment of the present invention, the at least one calcium carbonate-containing material used for preparing the high solids aqueous mineral and/or filler and/or pigment suspension has a charge density of between −0.01 and −2 C/g at pH 9, preferably of between −0.1 and −1 C/g at pH 9, more preferably of between −0.2 and −0.8 C/g at pH 9 and most preferably of between −0.3 and −0.7 C/g at pH 9.

It is preferred that the at least one calcium carbonate-containing material comprises at least one comb polymer, i.e. the at least one calcium carbonate-containing material comprises at least one kind of comb polymer.

The at least one comb polymer is preferably a comb-shaped polymer which is formed from a main chain, also referred to as back bone, and at least one side chain attached thereto.

Without being bound to any theory, it is believed that the at least one comb polymer is adsorbed to the weakly positively charged particles of the calcium carbonate-containing particles due to its negatively charged main chain, also called polymer back bone. Furthermore, the side chains of the adsorbed at least one comb polymer cause a steric and/or osmotic repulsion between the particles, which may lead to a steric and/or osmotic stabilization of at least a part of the particles in the high solids aqueous suspension.

Accordingly, the surface of the calcium carbonate-containing particles being part of the at least one calcium carbonate-containing material is preferably at least partially coated with the at least one comb polymer.

The expression "at least one" or "at least one kind of" comb polymer means that one or more kinds of comb polymers may be part of the at least one calcium carbonate-containing material in the high solids aqueous mineral and/or filler and/or pigment suspension.

According to one preferred embodiment of the present invention, the at least one calcium carbonate-containing material being part of the high solids aqueous mineral and/or filler and/or pigment suspension comprises only one kind of comb polymer. According to another embodiment of the present invention, the at least one calcium carbonate-containing material being part of the high solids aqueous mineral and/or filler and/or pigment suspension comprises a mixture of at least two kinds of comb polymers.

Accordingly, it is also appreciated that the high solids aqueous mineral and/or filler and/or pigment suspension comprises only one kind of comb polymer. According to another embodiment of the present invention, the high solids aqueous mineral and/or filler and/or pigment suspension comprises a mixture of at least two kinds of comb polymers.

It is preferred that the at least one comb polymer of the present invention is at least one anionically charged comb polymer, i.e. the at least one comb polymer of the present invention is at least one kind of anionically charged comb polymer.

The term "anionically charged" as used in the present invention is to be understood to mean that the comb polymer has a total or net charge that is negative, i.e. the sum of all positive and negative charges is negative. In other words, the polymer must possess an excess of anionically charged functional groups or residues. This means that the at least one anionically charged comb polymer being part of the at least one calcium carbonate-containing material of the present invention may comprise both positively and negatively charged functional groups or residues, i.e. cationic and anionic functional groups or residues, as long as the total or net charge is negative, i.e. the comb polymer is anionic. For example, the at least one anionically charged comb polymer being part of the at least one calcium carbonate-containing material may comprise only anionically charged functional groups or residues or may comprise anionically and cationically charged functional groups or residues such that the total or net charge of the at least one comb polymer is negative.

In one embodiment of the present invention, the at least one comb polymer is at least one anionically charged comb polymer having a specific charge of −10 to −250 C/g at pH 9, preferably from −10 C/g to −200 C/g at pH 9 and most preferably from −10 C/g to −150 C/g at pH 9.

For example, the at least one comb polymer is at least one anionically charged comb polymer having a specific charge from −20 C/g to −100 C/g at pH 9, preferably from −30 C/g to −100 C/g at pH 9 and most preferably from −30 C/g to −70 C/g at pH 9.

According to one embodiment of the present invention, the at least one calcium carbonate-containing material comprises at least one comb polymer having an intrinsic viscosity in the range of 5 to 99 ml/g, preferably in the range of 10 to 80 ml/g and most preferably in the range of 10 to 50 ml/g.

Additionally or alternatively, it is preferred that the at least one comb polymer has a specific charge of −10 to −250 C/g at pH 9 and an intrinsic viscosity in the range of 5 to 99 ml/g. It is further preferred that the at least one comb polymer has a specific charge from −10 C/g to −200 C/g at pH 9 and an intrinsic viscosity in the range of 10 to 80 ml/g. It is even further preferred that the at least one anionically charged comb polymer has a specific charge from −10 C/g to −150 C/g at pH 9 and an intrinsic viscosity in the range of 10 to 50 ml/g.

For example, it is preferred that the at least one comb polymer has a specific charge from −20 C/g to −100 C/g at pH 9 and an intrinsic viscosity in the range of 10 to 50 mug or a specific charge from −30 C/g to −100 C/g at pH 9 and an intrinsic viscosity in the range of 10 to 50 ml/g. In one embodiment of the present invention, the at least one comb polymer has a specific charge from −30 C/g to −70 C/g at pH 9 and an intrinsic viscosity in the range of 10 to 50 mug.

Comb polymers that may be suitable in the present invention are described in e.g. US 2009/0199741 A1, U.S. Pat. No. 6,387,176 B1, EP 1136508 A1, EP 1138697 A1, EP 1189955 A1, U.S. Pat. No. 6,946,510 B1, U.S. Pat. No. 7,514,488 B1 and EP 0736553 A1. These documents disclose processes to produce comb polymer as well as their use in mineral based binders such as cement. Suitable comb polymer are also described in the product brochure "SIKA ViscoCrete®, selbstverdickender Beton SCC" available on the website www.sika.ch.

Examples of comb polymers that may be used for the at least one calcium carbonate-containing material being part of the high solids aqueous suspension of the present invention are polymers of the MELFLUX® or MelPers® series, e.g. MelPers® 2450 by BASF (Trostberg, Germany), ETHACRYL® M dispersant by CoAtex, LLC (Chester, S.C.) or MIGHTY EG® dispersant by Kao Specialties Americas, LLC, (High Point, N.C.).

In general, the average molecular weight $M_W$ of the at least one comb polymer may vary in broad range and is typically in a range between 10 000 and 100 000 g/mol, preferably between 20 000 and 75 000 g/mol and most preferably between 25 000 and 50 000 g/mol.

In one preferred embodiment of the present invention, the high solids aqueous mineral and/or filler and/or pigment suspension comprises the at least one comb polymer in amount from 0.01 to 5 wt.-%, based on the total dry weight of the calcium carbonate-containing material in the suspension, preferably from 0.05 to 4 wt.-%, more preferably from 0.1 to 3 wt.-%, even more preferably from 0.2 to 2 wt.-%, and most preferably from 0.25 to 1.5 wt.-% or from 0.5 to 1.25 wt.-%. For example, the high solids aqueous mineral and/or filler and/or pigment suspension comprises the at least one comb polymer in an amount from 0.6 to 1.1 wt.-% or from 0.7 to 1 wt.-%, based on the total dry weight of the calcium carbonate-containing material in the suspension.

Additionally or alternatively, the at least one calcium carbonate-containing material comprises the at least one comb polymer in amount from 0.01 to 5 wt.-%, based on the total dry weight of the calcium carbonate-containing material in the suspension, preferably from 0.05 to 4 wt.-%, more preferably from 0.1 to 3 wt.-%, even more preferably from 0.2 to 2 wt.-%, and most preferably from 0.25 to 1.5 wt.-% or from 0.5 to 1.25 wt.-%. For example, the at least one calcium carbonate-containing material comprises the at least one comb polymer in an amount from 0.6 to 1.1 wt.-% or from 0.7 to 1 wt.-%, based on the total dry weight of the calcium carbonate-containing material in the suspension.

One further requirement of the inventive high solids aqueous mineral and/or filler and/or pigment suspension is that the suspension comprises at least one salt of at least one strong acid.

In particular, it is noted that the at least one strong acid forming the at least one salt of at least one strong acid is selected from the group consisting of acids having a $pK_a$ value at 23° C. of less than or equal to 0.

The expression "at least one" salt of at least one strong acid means that one or more salts of at least one strong acid may be present in the high solids aqueous mineral and/or filler and/or pigment suspension.

According to one preferred embodiment of the present invention, only one salt of at least one strong acid is present in the high solids aqueous mineral and/or filler and/or pigment suspension comprising the at least one calcium carbonate-containing material. According to another embodiment of the present invention, a mixture of at least two salts of at least one strong acid is present in the high solids aqueous mineral and/or filler and/or pigment suspension comprising the at least one calcium carbonate-containing material.

Furthermore, the expression at least one salt of "at least one" strong acid means that salts of one or more strong acids may be present in the high solids aqueous mineral and/or filler and/or pigment suspension.

According to one preferred embodiment of the present invention, at least one salt of only one strong acid is present in the high solids aqueous mineral and/or filler and/or pigment suspension comprising the at least one calcium carbonate-containing material. According to another embodiment of the present invention, at least one salt of a mixture of at least two strong acids is present in the high solids aqueous mineral and/or filler and/or pigment suspension comprising the calcium carbonate-containing material.

With regard to the cationic part of the at least one salt of at least one strong acid, it should be noted that any divalent and/or trivalent cation is suitable as cationic part of the at least one salt of at least one strong acid. In particular, any divalent and/or trivalent cation is suitable as cationic part of the at least one salt of at least one strong acid which provides a water soluble salt of the at least one strong acid forming the at least one salt of at least one strong acid.

The term "divalent cation" in the meaning of the present invention refers to a cation having a valency of two, e.g. a metal cation having two valencies.

The term "trivalent cation" in the meaning of the present invention refers to a cation having a valency of three, e.g. a metal cation having three valencies.

For example, the at least one salt of at least one strong acid comprises a divalent cation selected from the group consisting of calcium, magnesium, strontium and mixtures thereof. Additionally or alternatively, the at least one salt of at least one strong acid comprises aluminum as trivalent cation.

Preferably, the cationic part of the at least one salt of at least one strong acid is derived from the at least one calcium carbonate-containing material. It is thus appreciated that the at least one salt of at least one strong acid comprises at least calcium as cationic part of the at least one salt of at least one strong acid.

In one preferred embodiment of the present invention, the at least one salt of at least one strong acid comprises only calcium as cationic part of the at least one salt of at least one strong acid. In another preferred embodiment of the present invention, the at least one salt of at least one strong acid comprises calcium and magnesium and/or aluminum as cationic part of the at least one salt of at least one strong acid.

Furthermore, there are no specific restrictions regarding the at least one strong acid forming the at least one salt of at least one strong acid as long as said at least one strong acid is selected from the group consisting of acids having a $pK_a$ value of less than or equal to zero at +23° C.

Preferably, any strong acid forming the at least one salt of at least one strong acid is suitable which provides a water soluble salt of the at least one strong acid forming the at least one salt of at least one strong acid with the at least one calcium carbonate-containing material, that is to say at least the majority, preferably at least 75 wt.-%, more preferably at least 90 wt.-% and most preferably at least 96 wt.-% of the total amount of the at least one salt of at least one strong acid is dissolved within the water phase of the high solids aqueous mineral and/or filler and/or pigment suspension.

The term "dissolved" or "water soluble" in the meaning of the present invention refers to systems in which no discrete solid particles of the at least one salt of at least one strong acid are observed in the solvent.

According to one preferred embodiment of the present invention, the at least one strong acid forming the at least one salt of at least one strong acid is selected from the group consisting of hydrochloric acid, nitric acid and mixtures thereof.

For example, the at least one strong acid forming the at least one salt of at least one strong acid is hydrochloric acid.

The amount of the at least one salt of at least one strong acid in the high solids aqueous mineral and/or filler and/or pigment suspension may vary in a broad range. However, the high solids aqueous mineral and/or filler and/or pigment suspension comprises the at least one salt of at least one strong acid in an amount from 1 to 20 wt.-%, preferably from 2 to 15 wt.-%, more preferably from 3 to 12.5 wt.-% and most preferably from 4 to 10 wt.-%, based on the total weight of the high solids aqueous suspension.

Optionally, the high solids aqueous mineral and/or filler and/or pigment suspension further comprises further additives.

For example, the high solids aqueous mineral and/or filler and/or pigment suspension further comprises at least one reaction product or products of the at least one calcium carbonate-containing material with at least one medium strong acid.

The expression "at least one" reaction product or products means that one or more reaction product or products may be present in the high solids aqueous mineral and/or filler and/or pigment suspension.

According to one embodiment of the present invention, only one reaction product of the at least one calcium carbonate-containing material with at least one medium strong acid is present in the high solids aqueous mineral and/or filler and/or pigment suspension. According to another embodiment of the present invention, a mixture of at least two reaction products of the at least one calcium carbonate-containing material with at least one medium strong acid is present in the high solids aqueous mineral and/or filler and/or pigment suspension.

In particular, it is preferred that the at least one medium strong acid forming the at least one reaction product or products with the at least one calcium carbonate-containing material is chosen from amongst acids having a $pK_a$ value of between 0 and 2.5 at +23° C.

In one embodiment of the present invention, the at least one medium strong acid forming the at least one reaction product or products with the at least one calcium carbonate containing material is chosen from amongst medium strong acids forming divalent and/or trivalent cation salts. It is preferred that the at least one medium strong acid forming the at least one reaction product or products with the at least one calcium carbonate containing material is chosen from amongst medium strong acids forming divalent and/or trivalent cation salts, which are almost insoluble in water, that is to say with a solubility of less than 0.01% by weight acids having a $pK_a$ value of between 0 and 2.5 at +23° C.

For example, the at least one medium strong acid forming the at least one reaction product or products with the at least one calcium carbonate containing material is chosen from amongst medium strong acids forming divalent and/or trivalent cation salts, such as calcium and/or magnesium and/or aluminium salts.

In one embodiment of the present invention, the at least one medium strong acid forming the at least one reaction product or products with the at least one calcium carbonate containing material is selected from $H_2SO_3$, $HSO_4-$, $H_3PO_4$, oxalic acid and mixtures thereof. For example, the at least one medium strong acid forming at least one reaction product or products with the at least one calcium carbonate containing material is selected from $HSO_4-$ and/or $H_3PO_4$.

For example, the high solids aqueous mineral and/or filler and/or pigment suspension further comprises at least one reaction product or products of the at least one calcium carbonate-containing material with at least one weak acid.

The expression "at least one" reaction product or products means that one or more reaction product or products may be present in the high solids aqueous mineral and/or filler and/or pigment suspension.

According to one embodiment of the present invention, only one reaction product of the at least one calcium carbonate-containing material with at least one weak acid is present in the high solids aqueous mineral and/or filler and/or pigment suspension. According to another embodiment of the present invention, a mixture of at least two reaction products of the at least one calcium carbonate-containing material with at least one weak acid is present in the high solids aqueous mineral and/or filler and/or pigment suspension.

In particular, it is preferred that the at least one weak acid forming the at least one reaction product or products with the at least one calcium carbonate-containing material is chosen from amongst acids having a $pK_a$ value of between >2.5 and 6 at +23° C.

In one embodiment of the present invention, the at least one weak acid forming the at least one reaction product or products with the at least one calcium carbonate containing material is chosen from amongst weak acids forming monovalent and/or divalent and/or trivalent cation salts. It is preferred that the at least one weak acid forming the at least one reaction product or products with the at least one calcium carbonate containing material is chosen from weak acids forming divalent and/or trivalent cation salts, which are soluble in water, that is to say with a solubility of above 0.01% by weight acids having a $pK_a$ value of between 0 and 2.5 at +23° C.

For example, the at least one weak acid forming the at least one reaction product or products with the at least one calcium carbonate containing material is chosen from amongst weak acids forming divalent and/or trivalent cation salts, such as calcium and/or magnesium and/or aluminium salts.

In one embodiment of the present invention, the at least one weak acid forming the at least one reaction product or products with the at least one calcium carbonate containing material is selected from citric acid, tartaric acid and mixtures thereof. For example, the at least one weak acid forming the at least one reaction product or products with the at least one calcium carbonate containing material is selected from citric acid or tartaric acid.

According to one embodiment of the present invention, the molar quantity of the sum, expressed by the generated $H_3O^+$ ions, of the at least one medium strong acid forming the at least one reaction product or products of the at least one calcium carbonate-containing material and/or the at least one weak acid forming the at least one reaction product or products of the at least one calcium carbonate-containing material and the at least one strong acid forming the at least one salt of at least one strong acid relative to the quantity of moles of $CaCO_3$ is in total between 0.01 and 1.9.

For example, the molar quantity of the sum, expressed by the generated $H_3O^+$ ions, of the at least one medium strong acid forming the at least one reaction product or products of the at least one calcium carbonate-containing material and/or the at least one weak acid forming the at least one reaction product or products of the at least one calcium carbonate-containing material and the at least one strong acid forming the at least one salt of at least one strong acid relative to the quantity of moles of $CaCO_3$ is in total between 0.05 and 1 and most preferably between 0.5 and 1.

With regard to the amount of the at least one reaction product or products of the at least one calcium carbonate-containing material with at least one medium strong acid and/or with at least one weak acid in the high solids aqueous mineral and/or filler and/or pigment suspension it should be noted that the amount may vary in a broad range. However, the high solids aqueous mineral and/or filler and/or pigment suspension comprises the at least one reaction product or products of the at least one calcium carbonate-containing material with at least one medium strong acid and/or with at least one weak acid in an amount from 1 to 20 wt.-%, preferably from 2 to 15 wt.-%, more preferably from 3 to 12.5 wt.-% and most preferably from 4 to 10 wt.-%, based on the total weight of the high solids aqueous suspension.

Additionally or alternatively, the high solids aqueous mineral and/or filler and/or pigment suspension may further comprise aluminum hydroxide and/or magnesium hydroxide.

In one embodiment of the present invention, the high solids aqueous mineral and/or filler and/or pigment suspension comprises aluminum hydroxide and/or magnesium hydroxide in an amount from 0.1 to 20 wt.-%, preferably from 0.1 to 15 wt.-%, more preferably from 1 to 12.5 wt.-% and most preferably from 1 to 10 wt.-%, based on the total weight of the high solids aqueous suspension.

The high solids aqueous mineral and/or filler and/or pigment suspension in acidic pH environment according to the present invention comprises at least one calcium carbonate-containing material as defined above and at least one salt of at least one strong acid as defined above. The solids content of the high solids aqueous mineral and/or filler and/or pigment suspension is at least 50 wt.-%, based on the total weight of the high solids aqueous suspension.

According to one preferred embodiment of the present invention, the high solids aqueous suspension has solids content from 50 to 82 wt.-%, preferably from 55 to 82 wt.-%, more preferably from 60 to 78 wt.-% and most preferably from 65 to 78 wt.-%, based on the total weight of the high solids aqueous suspension.

The inventive high solids aqueous mineral and/or filler and/or pigment suspension does not freeze at temperatures of −5° C. or even below and thus features an advantageous Brookfield viscosity at such low temperature compared to suspensions described in the prior art. It is thus appreciated that the Brookfield viscosity of the high solids aqueous mineral and/or filler and/or pigment suspension at 100 rpm is ≤1 000 mPas at a temperature of −5° C.

According to the present invention, the Brookfield viscosity is measured after 5 minutes of stirring by the use of an RVT model Brookfield™ viscometer at a temperature of about −5° C. and about +23° C., and a rotation speed of 100 rpm (revolutions per minute) with the appropriate disc spindle No 1 to 5. The reported viscosity values are the values detected by the instrument after 1 minute of measurement.

According to one preferred embodiment of the present invention, the high solids aqueous mineral and/or filler and/or pigment suspension has a Brookfield viscosity at 100 rpm from 25 to 1 000 mPas at a temperature of −5° C., preferably from 25 to 700 mPas at −5° C., more preferably from 25 to 500 mPas at −5° C. and most preferably from 50 to 300 mPas at −5° C.

In one preferred embodiment of the present invention, the Brookfield viscosity of the high solids aqueous mineral and/or filler and/or pigment suspension measured at −5° C. and at 100 rpm is equal to the Brookfield viscosity of the high solids aqueous mineral and/or filler and/or pigment suspension measured at +23° C. and at 100 rpm.

For the purposes of the present application, the Brookfield viscosity is considered as being equal if the Brookfield viscosity at −5° C. and +23° C. and measured at the same time at 100 rpm do not differ by more than 100 mPas, preferably by not more than 75 mPas and most preferably by not more than 50 mPas.

For example, the Brookfield viscosity at 100 rpm of the high solids aqueous mineral and/or filler and/or pigment suspension is ≤1 000 mPas at −5° C. and at +23° C., preferably from 25 to 1 000 mPas at −5° C. and at +23° C., more preferably from 25 to 700 mPas at −5° C. and at +23° C., even more preferably from 25 to 500 mPas at −5° C. and at +23° C. and most preferably from 50 to 300 mPas at −5° C. and at +23° C.

It is a further requirement of the instant invention that the high solids aqueous mineral and/or filler and/or pigment suspension has a pH of <6 at +23° C. Preferably, the high solids aqueous mineral and/or filler and/or pigment suspension has a pH of <6 at +23° C. measured after 24 hours after preparation of the high solids aqueous mineral and/or filler and/or pigment suspension.

According to one preferred embodiment of the present invention, the high solids aqueous suspension has a pH of between 4 and <6 at +23° C., preferably a pH of between 4.5 and <6 at +23° C. and preferably a pH of between 5 and <6 at +23° C. Preferably, the high solids aqueous suspension has a pH between 4 and <6 at +23° C., preferably a pH of between 4.5 and <6 at +23° C. and preferably a pH of between 5 and <6 at +23° C. measured after 24 hours after preparation of the high solids aqueous mineral and/or filler and/or pigment suspension.

The high solids aqueous mineral and/or filler and/or pigment suspension especially features a low electrical conductivity at −5° C. and at +23° C. It is preferred that the high solids aqueous mineral and/or filler and/or pigment suspension has a conductivity of between 10 and 100 mS/cm at −5° C. and at +23° C.

According to one preferred embodiment of the present invention, the conductivity of the high solids aqueous mineral and/or filler and/or pigment suspension is between 20 mS/cm and 100 mS/cm measured at −5° C. and at +23° C. and preferably between 30 mS/cm and 100 mS/cm measured at −5° C. and at +23° C.

In one preferred embodiment of the present invention, the conductivity of the high solids aqueous mineral and/or filler and/or pigment suspension at −5° C. is equal to the conductivity of the high solids aqueous mineral and/or filler and/or pigment suspension at +23° C.

For the purposes of the present application, the conductivity is considered as being equal if the conductivity at −5° C. and +23° C. and measured at the same time do not differ by more than 30 mS/cm, preferably by more than 20 mS/cm and most preferably by more than 15 mS/cm.

In one embodiment of the present invention, the high solids aqueous suspension has a positive charge density in acidic pH environment, preferably at pH 5. For example, the high solids aqueous suspension has a positive charge density of at least +0.1 C/g at pH 5, preferably of at least +0.5 C/g at pH 5, more preferably of at least +1 C/at pH 5 and most preferably of at least +1.5 C/g at pH 5.

It is appreciated that the high solids aqueous mineral and/or filler and/or pigment suspension may be dried in order to obtain the calcium carbonate-containing material. The drying of the high solids aqueous mineral and/or filler and/or pigment suspension can be accomplished by any conventional means known to the skilled person, for example, thermally, e.g. by means of a spray drier or a microwave or in an oven, or mechanically, e.g. by filtration, or lowering the water content.

If the high solids aqueous mineral and/or filler and/or pigment suspension is dried, the water content of the obtained calcium carbonate-containing material is preferably below 5 wt.-%, more preferably below 4 wt.-%, even more preferably below 3 wt.-% and most preferably below 2 wt.-%, based on the total dry weight of the calcium carbonate-containing material. For example, the water content of the obtained calcium carbonate-containing material is below 1 wt.-% or below 0.5 wt.-%, based on the total dry weight of the calcium carbonate-containing material.

In view of the advantageous properties of the high solids aqueous mineral and/or filler and/or pigment suspension, especially the exceptional mechanical properties expressed by a Brookfield viscosity at 100 rpm of ≤1 000 mPas at a temperature of −5° C. and stability in acidic pH environment, the inventive high solids aqueous mineral and/or filler and/or pigment suspension is suitable in a broad variety of applications.

In view of the very good results regarding the mechanical and optical properties of the high solids aqueous mineral and/or filler and/or pigment suspension as defined above, a further aspect of the present invention is the use of said high solids aqueous suspension and/or the calcium carbonate-containing material obtained by drying said high solids aqueous suspension in paper making, paper coating, plastic, agricultural and/or paint applications. In one embodiment of the present invention, the high solids aqueous mineral and/or filler and/or pigment suspension and/or the calcium carbonate-containing material obtained by drying said high solids aqueous suspension is used as a support for digital printing, preferred ink jet printing, or for flexo, rotogravure and/or offset printing, most preferably for black ink printing in inkjet printing.

According to a further aspect of the present invention, the high solids aqueous mineral and/or filler and/or pigment suspension and/or the calcium carbonate-containing material obtained by drying said high solids aqueous suspension can be used as filler in paper.

According to another aspect of the present invention, a coating color formulation comprising the high solids aqueous mineral and/or filler and/or pigment suspension and/or the calcium carbonate-containing material obtained by drying said high solids aqueous suspension is provided.

It is preferred that the coating color formulation comprises the high solids aqueous mineral and/or filler and/or pigment suspension as defined above and/or the calcium carbonate-containing material obtained by drying said high solids aqueous suspension as defined above and a natural and/or synthetic binder.

According to one preferred embodiment of the present invention, the natural and/or synthetic binder consists of styrene-butadiene, styrene-acrylate, polyvinyl acetate, polyvinyl alcohol, starch or mixtures thereof. Preferably, the natural and/or synthetic binder contains or consists of polyvinyl alcohol.

If the natural and/or synthetic binder comprises a mixture of at least two natural and/or synthetic binders, one binder is preferably polyvinyl alcohol or polyvinyl acetate and a further binder is starch and/or carboxymethyl cellulose.

With regard to the amount of the natural and/or synthetic binder in the coating color formulation comprising the high solids aqueous mineral and/or filler and/or pigment suspension and/or the calcium carbonate-containing material obtained by drying said high solids aqueous suspension it should be noted that the amount may vary in a broad range as long as a sufficient binding capacity is achieved. However, it is preferred that the coating color formulation comprises the natural and/or synthetic binder in an amount between 2.5 and 20 wt.-% and preferably between 5 and 17 wt.-%, based on the total dry weight of the coating color formulation.

In particular, it should be noted that the aforementioned advantageous properties of the high solids aqueous mineral and/or filler and/or pigment suspension are not obtained if the at least one calcium carbonate containing material as defined above is contacted with calcium chloride. Accordingly, the high solids aqueous mineral and/or filler and/or pigment suspension is preferably obtainable by the method for producing a high solids aqueous mineral and/or filler and/or pigment suspension described below.

According to another aspect of the present invention, a method for producing an aqueous calcium carbonate containing composition is provided, comprising the steps of a) providing an aqueous suspension comprising at least one calcium carbonate-containing material, wherein the calcium carbonate-containing material has a charge density of between +2 and −2 C/g at pH 9, b) providing
 i) at least one strong acid selected from the group consisting of acids having a $pK_a$ value of less than or equal to zero at +23° C., and/or
 ii) at least one salt of at least one strong acid, wherein the at least one strong acid forming the at least one salt of at least one strong acid is selected from the group consisting of acids having a $pK_a$ value of less than or equal to zero at +23° C.

c) adding the at least one strong acid and/or the at least one salt of at least one strong acid of step b) to the aqueous suspension comprising at least one calcium carbonate-containing material of step a), d) optionally grinding the aqueous suspension comprising at least one calcium carbonate-containing material of step a) before and/or during and/or after step c), wherein the high solids aqueous suspension after step c) and/or d) has i) a solids content of at least 50 wt.-%, based on the total weight of the high solids aqueous suspension, ii) a Brookfield viscosity at 100 rpm of ≤1 000 mPas at a temperature of −5° C., iii) a pH of <6 at +23° C., and iv) a conductivity of between 10 and 100 mS/cm at −5° C. and at +23° C.

In one preferred embodiment of the present invention, the method further comprises step e) of providing at least one medium strong acid selected from the group consisting of acids having a $pK_a$ value of between 0 and 2.5 at +23° C., preferably the at least one medium strong acid is selected from $H_2SO_3$, $HSO_4^-$, $H_3PO_4$, oxalic acid and mixtures thereof, and/or at least one weak acid selected from the group consisting of acids having a $pK_a$ value of between >2.5 to 6.0 at +23° C., preferably the at least one weak acid is selected from citric acid and/or tartaric acid.

If the instant invention comprises step e) of providing at least one medium strong acid and/or at least one weak acid, the method preferably further comprises step f) of contacting the aqueous suspension comprising at least one calcium carbonate-containing material of step a) with the at least one medium strong acid and/or at least one weak acid during and/or after step c), and/or during and/or after optional step d).

The addition of the at least one strong acid and/or the at least one salt of at least one strong acid to the aqueous suspension comprising a calcium carbonate-containing material of step c) and the optional contacting of the aqueous suspension comprising a calcium carbonate-containing material of step f) can be accomplished by any conventional means known to the skilled person. Preferably, the addition and/or contacting is/are carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a plough share mixer as e.g. already described above.

It is one specific requirement of the instant method that the aqueous suspension comprising a calcium carbonate-containing material is provided first such that the at least one strong acid and/or the at least one salt of at least one strong acid is added to the aqueous suspension comprising a calcium carbonate-containing material. Accordingly, it is appreciated that method step c) is carried out in that the at least one strong acid and/or the at least one salt of at least one strong acid is dosed into the aqueous suspension comprising a calcium carbonate-containing material.

According to one embodiment of the present invention, the aqueous suspension comprising a calcium carbonate-containing material of step a) is ground in optional method step d). If the calcium carbonate-containing material being part of the aqueous suspension of step a) comprises ground calcium carbonate particles, the aqueous suspension of step a) is preferably wet ground in optional method step d).

In one embodiment of the present invention, the aqueous suspension of step a) comprises a calcium carbonate-containing material comprising ground calcium carbonate particles which is obtained by grinding, preferably wet grinding, a calcium carbonate-containing material in method step d) and method steps c) and optional method step f) are independently carried out before and/or during and/or after grinding, preferably wet grinding, the calcium carbonate-containing material in method step d). Preferably, method steps c) and optional method step f) are carried out after grinding, preferably wet grinding, the calcium carbonate containing material of the aqueous suspension in method step d).

The method step c) and/or step d) and/or step f) may be carried out at a temperature of between −5° C. and +99° C., preferably between +20° C. and +85° C. and most preferably between +20° C. and +50° C. and most preferably between +50° C. and +85° C.

According to one embodiment of the present invention, method step c) and/or step d) and/or step f) may be carried out for at least 1 s, preferably for at least 1 min, e.g. for at least 15 min, 30 min, 1 hour, 2 hours, 4 hours, 6 hours, 8 hours, or 10 hours.

It is preferred that the addition of the at least one strong acid and/or the at least one salt of at least one strong acid of step b) to the aqueous suspension comprising at least one calcium carbonate-containing material of step a) according to method step c) is carried out after optional method step d). Accordingly, method step c) is carried out after optional method step d).

If optional method step f) is carried out, it is preferred that the contacting of the aqueous suspension comprising the calcium carbonate containing material of step a) with the at least one medium strong acid and/or at least one weak acid of step e) is carried out after the addition of the at least one strong acid and/or the at least one salt of at least one strong acid of step b) to the aqueous suspension comprising at least one calcium carbonate-containing material of step a) according to method step c). Accordingly, optional method step f) is carried out after method step c).

According to one embodiment of the present invention, the aqueous suspension comprising a calcium carbonate containing material of step a) is contacted with further additives known to the skilled person. For example, the aqueous suspension comprising a calcium carbonate containing material of step a) is further contacted with aluminium hydroxide and/or magnesium hydroxide, preferably in form of a dry product or suspension.

Preferably, the contacting of the aqueous suspension comprising a calcium carbonate containing material of step a) with the at least one further additive is carried out before and/or during and/or after step c) and/or before and/or during and/or after optional step d) and/or before and/or during and/or after optional step f). Preferably, the contacting of the aqueous suspension comprising a calcium carbonate containing material of step a) with the at least one further additive is carried out after step c) and/or after optional step d) and/or after optional step f).

The high solids aqueous mineral and/or filler and/or pigment suspension obtained according to the inventive method described above may be concentrated with any method known in the art according to method step g) which is suitable for lowering the water content of the obtained high solids aqueous mineral and/or filler and/or pigment suspension. The high solids aqueous mineral and/or filler and/or pigment suspension may be concentrated in method step g), for example, thermally or mechanically for lowering the water content. For example, the high solids aqueous suspension may be concentrated such that the solids content in the obtained aqueous suspension is at least 60 wt.-%, preferably 65 wt.-%, more preferably 70 wt.-% and most preferably 75 wt.-%, based on the total weight of the obtained high solids aqueous suspension.

The high solids aqueous mineral and/or filler and/or pigment suspension obtained according to the inventive method described above may be dried with any suitable method known in the art such that a calcium carbonate-containing material is obtained. The high solids aqueous mineral and/or filler and/or pigment suspension may be dried, for example, thermally, e.g. by means of a spray drier or a microwave or in an oven, or mechanically, e.g. by filtration.

The inventive high solids aqueous mineral and/or filler and/or pigment suspension can be mixed with water to obtain a diluted aqueous mineral and/or filler and/or pigment suspension of the inventive high solids aqueous mineral and/or filler and/or pigment suspension.

The scope and interest of the invention will be better understood based on the following examples which are intended to illustrate certain embodiments of the invention and are non-limitative.

EXAMPLES

1. Measurement Methods pH Measurement

The pH is measured at +23° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at +20° C. (from Aldrich). The reported pH values are the endpoint values detected by the instrument (the endpoint is when the measured signal differs by less than 0.1 mV from the average over the last 6 seconds).

Brookfield Viscosity

The Brookfield viscosity was measured by using a RVT model Brookfield™ viscometer at a temperature of +23° C. and −5° C., and a rotation speed of 100 rpm (revolutions per minute) with the appropriate disc spindle from No 1 to 5. The reported viscosity values are the values detected by the instrument after 1 minute of measurement. Before measuring the Brookfield viscosity the suspension was stirred for 5 minutes using a Pendraulik laboratory dissolver, 0.25-2.5 kW, mechanically adjustable up to 8400 rpm with an appropriate tooth disc stirrer.

Electrical Conductivity Measurement

The conductivity of a suspension was measured at −5° C. and +23° C. using Mettler Toledo Seven Multi instrumentation equipped with the corresponding Mettler Toledo conductivity expansion unit and a Mettler Toledo InLab® 730 conductivity probe, directly following stirring this suspension at 1 500 rpm using a Pendraulik tooth disc stirrer.

The instrument was first calibrated in the relevant conductivity range using commercially available conductivity calibration solutions from Mettler Toledo. The influence of temperature on conductivity was automatically corrected by the linear correction mode.

Measured conductivities are reported for the reference temperature of +23° C. The reported conductivity values are the endpoint values detected by the instrument (the endpoint is when the measured conductivity differs by less than 0.4% from the average over the last 6 seconds).

Particle Size Distribution (Mass % Particles with a Diameter <X) and Weight Median Grain Diameter ($d_{50}$) of Particulate Material Weight median grain diameter and grain diameter mass distribution of a particulate material were determined via the sedimentation method, i.e. an analysis of sedimentation behaviour in a gravimetric field. The measurement was made with a Sedigraph™ 5120.

The method and the instrument are known to the skilled person and are commonly used to determine grain size of fillers and pigments. The samples were pre-diluted to the right concentration by using deionized water but no further additives, such as usually added dispersants like polyphosphate or polyacrylate as, and dispersed by using a high speed stirrer and ultrasonic.

Weight Solids (Wt. %) of a Material in Suspension

The weight solids were determined by dividing the weight of the solid material by the total weight of the aqueous suspension. The weight solids content was determined at +160° C. using a Moisture Analyser MJ 33, Mettler Toledo.

Specific Surface (BET) Measurement

The specific surface area (in $m^2/g$) of the mineral filler was determined using the BET method, which is well known to the skilled man (ISO 9277:1995). The total surface area (in $m^2$) of the mineral filler was then obtained by multiplication of the specific surface area and the mass (in g) of the mineral filler. The method and the instrument are known to the skilled person and are commonly used to determine specific surface of fillers and pigments.

Specific Charge (C/g)

The cationic polymer demand that is necessary to achieve a charge value of zero was measured using the Mettler DL 77 titrator and the Mütec PCD-02 detector by means of the cationic titration method. The cationic reagent was N/200 (0.005 N) methyl glycol chitosan (chitosan), and the anionic reagent was N/400 (0.0025 N) K-polyvinyl-sulfate (KPVS), both sold by WAKO Chemicals GmbH.

If necessary, the sample was adjusted to pH 8.0+/−0.1 with NaOH (0.1M) prior to measurement.

Since experience showed that the first titration is not correct, 10 ml water were first prepared in the detector followed by the addition of 0.5 ml KPVS.

Afterwards, titration with chitosan was made until it is back to shortly after the equivalence point. Subsequently, the measurements were started. Between 0.5 and 2.0 ml of 0.005 molar reagent were used up during the titration to obtain reproducible values.

To avoid rapid sedimentation, the sample was drawn under stirring, by means of a tared syringe. The content of the syringe was then rinsed into the sample vessel by means of distilled water. Afterwards, the detector was filled with distilled water up to the lower edge and the piston was inserted carefully. Subsequently, the cationic titration solution was put on the memotitrator and the top of the burette was fixed at the detector ensuring that it does not come into contact with the detector or the liquid. After each titration, the development of the titration was verified with the aid of the titration curve.

Calculation of the electrochemical charge:

$$\text{Charge}[\mu Eq/g] = \frac{V \cdot c \cdot z \cdot t}{E \cdot F} \cdot K$$

wherein K=+1 000
V: Consumption chitosan [ml]
c: Concentration chitosan [mol/l]
t: Titer factor chitosan
E: Weight-in quantity [g]
F: Mass fraction solids [g/g]
z: Valence (equivalence number)

The obtained charge value of μVal/g was converted into C/g by multiplication with the Faraday constant as follows:

[C/g]=[μVal/g]·0.096485

Optical Density

The optical density is a dimension for the thickness of the colour layer above the substrate. Optical density values are calculated based on the spectral measurement, therefore slight differences to the measurement with a densitometer may occur. The calculation is made according to the DIN Norm 16536-2.

2. Examples

A. Suspensions Comprising Calcium Carbonate-Containing Material

The details regarding the suspensions comprising calcium carbonate-containing material as used in the example section are described in the following:

Suspension 1

A natural calcium carbonate (marble) of Italian origin is obtained by first autogeneously dry grinding 10 to 300 mm calcium carbonate rocks to a fineness corresponding to a $d_{50}$ value of between 42 to 48 μm, and subsequently wet grinding this dry-ground product at +30 to +35° C. in water in a 1.4-liter vertical attritor mill (Dynomill) at a weight solids content of about 75 wt.-%, based on the total weight of the slurry, until 90 wt.-% of the particles have a diameter <2 μm, 16 wt.-% have a diameter <0.2 μm, and a $d_{50}$ value of 0.9 μm was reached, using 0.82 wt.-% in respect to dry $CaCO_3$ of a comb polymer having a specific charge of −49 C/g measured at pH 5.9 and −69 C/g measured at pH 8 and an intrinsic viscosity of 30.3 ml/g (MelPers® 2450, available from BASF, Germany).

The charge density of the calcium carbonate-containing material in the suspension was −0.3 C/g at pH 9. The specific surface (BET) was determined to be 10.9 $m^2/g$.

Suspension 2

A natural calcium carbonate (marble) of Italian origin is obtained by first autogeneously dry grinding 10 to 300 mm calcium carbonate rocks to a fineness corresponding to a $d_{50}$ value of between 42 to 48 μm, and subsequently wet grinding this dry-ground product at +30 to +35° C. in water in a 1.4-liter vertical attritor mill (Dynomill) at a weight solids content of about 75.9 wt.-%, based on the total weight of the slurry, until 90 wt.-% of the particles have a diameter <2 µm, 12 wt.-% have a diameter <0.2 µm, and a $d_{50}$ value of 0.9 µm was reached, using 1.44 wt.-% in respect to dry $CaCO_3$ of a comb polymer having a specific charge of −92 C/g measured at pH 8 and an intrinsic viscosity of 12.5 mug (MelPers® 4343, available from BASF, Germany). The charge density of the calcium carbonate-containing material in the suspension was −0.75 C/g at pH 9. The specific surface (BET) was determined to be 10.5 m²/g.

Suspension 3

A natural calcium carbonate (marble) of Italian origin is obtained by first autogeneously dry grinding 10 to 300 mm calcium carbonate rocks to a fineness corresponding to a $d_{50}$ value of between 42 to 48 µm, and subsequently wet grinding this dry-ground product at +30 to +35° C. in water in a 1.4-liter vertical attritor mill (Dynomill) at a weight solids content of about 76 wt.-%, based on the total weight of the slurry, until 92 wt.-% of the particles have a diameter <2 µm, 18 wt.-% have a diameter <0.2 µm, and a $d_{50}$ value of 0.75 µm was reached, using 1.1 wt.-% in respect to dry $CaCO_3$ of a comb polymer having a specific charge of −49 C/g measured at pH 5.9 and −69 C/g measured at pH 8 and an intrinsic viscosity of 30.3 ml/g (MelPers® 2450, available from BASF, Germany). The charge density of the calcium carbonate-containing material in the suspension was −0.4 C/g at pH 9. The conductivity of the suspension was measured as being 510 µS/cm, while the pH of the suspension was 7.9 at +23° C. The specific surface (BET) was determined to be 11.9 m²/g.

Example 1

Comparative Example

This example illustrates the prior art and concerns the processing of a suspension comprising a calcium carbonate-containing material in combination with a solution comprising a calcium salt of hydrochloric acid. In particular, the calcium carbonate-containing material is added to the solution comprising a calcium salt of hydrochloric acid.

30 g $CaCl_2$ (Fluka) were dissolved in 70 ml distilled water. The obtained solution had a pH of 8.6 at +23° C. Into this solution, 30 g $CaCO_3$ (Fluka) were dispersed under agitation to form a suspension of $CaCO_3$ in $CaCl_2$ solution. The obtained suspension had a pH of 8.6 at +23° C. Into this suspension 0.4 g Melpers 4343 (available from BASF, Germany), in form of a 50 wt.-% solution (BASF), based on the total weight of the solution, corresponding to 0.66 wt.-% in respect to $CaCO_3$ in the suspension, were dosed under agitation. The obtained suspension had a pH of 8.6 at +23° C. after 1 hour.

As can be gathered from the details regarding the measured pH, no pH drop to below 6 at +23° C. was observed.

Example 2

Comparative Example

This example illustrates the prior art and concerns the processing of a suspension comprising a calcium carbonate-containing material in combination with a solution comprising a calcium salt of hydrochloric acid. In particular, the calcium carbonate-containing material is added to the solution comprising a calcium salt of hydrochloric acid.

20 g $CaCl_2$ (Fluka) were dissolved in 60 ml distilled water in presence of 2.1 g Melpers 4343 (available from BASF, Germany), in form of a 50 wt.-% solution (BASF), based on the total weight of the solution, and at a temperature of +50° C. The obtained solution had a pH of 7.7 at +23° C. Into this solution, 100 g $CaCO_3$ (Fluka) were dispersed under agitation at about 35° C. to form a suspension of $CaCO_3$ in $CaCl_2$ solution. The obtained suspension had a pH of 7.3 at +23° C. after 1 hour.

As can be gathered from the details regarding the measured pH, no pH drop to below 6 at +23° C. was observed.

Example 3

Inventive Example

This example illustrates the invention and concerns the processing of a suspension comprising a calcium carbonate-containing material with high dry matter content in combination with hydrochloric acid as strong acid. In particular, the hydrochloric acid is added to the calcium carbonate-containing material.

598 g of the 75 wt.-% of suspension 1 was placed in a stirred 1 liter glass backer and heated under agitation to +70° C. To this suspension hydrochloric acid was added drop wise as a 10 wt.-% solution. The goal was to add 164 g of the hydrochloric acid solution in 45 minutes. The obtained aqueous suspension had solids content of 59.1 wt.-%, based on the total weight of the suspension.

The details regarding the measured Brookfield viscosities (determined at −5° C. and +23° C. and 100 rpm), pH at +23° C. and conductivity can be taken from Table 1.

TABLE 1

|  | −5° C. | +23° C. |
| --- | --- | --- |
| Brookfield viscosity after 1 hour [mPas] |  | 35 |
| Brookfield viscosity after 1 day [mPas] | 65 |  |
| pH after 1 hour |  | 5.4 |
| pH after 1 day |  | 5.57 |
| pH after 3 days |  | 5.58 |
| pH after 6 days |  | 5.94 |
| Conductivity after 6 days [mS/cm] | 42.1 | 53.0 |

From Table 1 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

Example 4

Inventive Example

This example illustrates the invention and concerns the processing of a suspension comprising calcium carbonate-containing material with high dry matter content in combination with hydrochloric acid as strong acid. In particular, the hydrochloric acid is added to the calcium carbonate-containing material.

610 g of the 75.9 wt.-% of suspension 3 was placed in a stirred 1 liter glass backer and heated under agitation to +75° C.

To this suspension hydrochloric acid was added drop wise in form of a 10 wt.-% solution. The goal was to add 164 g of the hydrochloric acid solution in 45 minutes. The obtained aqueous suspension had solids content of 59.3 wt.-%, based on the total weight of the suspension (suspension 4).

The details regarding the measured Brookfield viscosities (determined at −5° C. and +23° C. and 100 rpm), pH at +23° C. and conductivity can be taken from Table 2.

TABLE 2

|  | −5° C. | +23° C. |
|---|---|---|
| Brookfield viscosity after 6 day [mPas] | 65 | 70 |
| pH after 1 hour |  | 5.13 |
| pH after 2 days |  | 5.42 |
| pH after 3 days |  | 5.41 |
| pH after 6 days |  | 5.70 |
| Conductivity after 6 days [mS/cm] | 44.9 | 53.0 |

From Table 2 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

Example 5

Inventive Example

This example illustrates the invention and concerns the processing of a suspension comprising calcium carbonate-containing material with high dry matter content in combination with hydrochloric acid as strong acid. In particular, the hydrochloric acid is added to the calcium carbonate-containing material.

598 g of the 75 wt.-% of suspension 1 was placed in a stirred 1 liter glass backer and heated under agitation to +80° C. To this suspension hydrochloric acid was added drop wise as a 37 wt.-% solution. The goal was to add 12.7 g of the hydrochloric acid solution in 45 minutes. The obtained aqueous suspension had solids content of 67.4 wt.-%, based on the total weight of the suspension.

The details regarding the measured Brookfield viscosities (determined at −5° C. and +23° C. and 100 rpm), pH at +23° C. and conductivity can be taken from Table 3.

TABLE 3

|  | −5° C. | +23° C. |
|---|---|---|
| Brookfield viscosity after 1 hour [mPas] |  | 60 |
| Brookfield viscosity after 6 days [mPas] | 85 |  |
| pH after 1 hour |  | 4.6 |
| pH after 2 days |  | 4.78 |
| pH after 6 days |  | 5.22 |
| Conductivity after 6 days [mS/cm] | 89.7 | 80.0 |

From Table 3 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

Example 6

Inventive Example

This example illustrates the invention and concerns the processing of a suspension comprising calcium carbonate-containing material with high dry matter content in combination with nitric acid as strong acid.

In particular, the nitric acid is added to the calcium carbonate-containing material.

598 g of the 75 wt.-% of suspension 1 was placed in a stirred 1 liter glass backer and heated under agitation to +60° C. To this suspension nitric acid was added drop wise as a 65 wt.-% solution.

The goal was to add 46.8 g of the nitric acid solution in 45 minutes. The obtained aqueous suspension had solids content of 74.4 wt.-%, based on the total weight of the suspension.

The details regarding the measured Brookfield viscosities (determined at −5° C. and +23° C. and 100 rpm), pH at +23° C. and conductivity can be taken from Table 4.

TABLE 4

|  | −5° C. | +23° C. |
|---|---|---|
| Brookfield viscosity after 1 hour [mPas] |  | 60 |
| Brookfield viscosity after 6 day [mPas] | 125 |  |
| pH after 1 hour |  | 5.7 |
| pH after 1 day |  | 5.7 |
| pH after 2 days |  | 5.79 |
| Conductivity after 6 days [mS/cm] | 35.1 | 38.4 |

From Table 4 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

Example 7

Inventive Example

This example illustrates the invention and concerns the processing of a suspension comprising calcium carbonate-containing material with high dry matter content in combination with hydrochloric acid as strong acid.

In particular, the hydrochloric acid is added to the calcium carbonate-containing material.

1064 g of the 75 wt.-% of suspension 1 was placed in a stirred 1 liter glass backer and agitated. The Brookfield viscosity of the suspension was 60 mPas measured at 100 rpm and +23° C. To this suspension hydrochloric acid was added drop wise at 20° C. as a 32 wt.-% solution. The goal was to add 182.5 g of the hydrochloric acid solution in 45 minutes. The obtained aqueous suspension had solids content of 68.2 wt.-%, based on the total weight of the suspension.

The Brookfield viscosity of the suspension was 60 mPas measured at 100 rpm and +23° C., the pH at +23° C. was 4.45 measured 1 hour after the preparation of the suspension. 1 hour after the preparation of the suspension, the suspension was stored at +80° C. for 6 hours and cooled back to +23° C.

The details regarding the measured Brookfield viscosities (determined at −5° C. and +23° C. and 100 rpm), pH at +23° C. and conductivity can be taken from Table 5.

TABLE 5

|  | −10° C. | −5° C. | +5° C. | +23° C. |
|---|---|---|---|---|
| Brookfield viscosity after 3 days [mPas] | 107 | 106 | 96 |  |
| Brookfield viscosity after 6 days [mPas] |  | 80 |  |  |
| pH after 1 day |  |  |  | 5.95 |
| pH after 6 days |  |  |  | 5.18 |
| Conductivity after 6 days [mS/cm] |  | 91.4 |  | 81.7 |

From Table 5 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

Example 8

Inventive Example

This example illustrates the invention and concerns the processing of suspension comprising calcium carbonate-containing material with high dry matter content in combination with nitric acid as strong acid and a salt of a strong acid. In particular, the nitric acid is added to the calcium carbonate-containing material.

598 g of the 75 wt.-% of suspension 1 was placed in a stirred 1 liter glass backer and heated under agitation to +70° C. To this suspension nitric acid was added drop wise as a 65 wt.-% solution. The goal was to add 46.8 g of the nitric acid solution in 45 minutes. The obtained aqueous suspension was cooled to +20° C. and 23.4 g lithium chloride was added to the suspension under agitation. The obtained aqueous suspension had solids content of 75.9 wt.-%, based on the total weight of the suspension.

The details regarding the measured Brookfield viscosities (determined at −5° C. and +23° C. and 100 rpm), pH at +23° C. and conductivity can be taken from Table 6.

TABLE 6

|  | −6° C. | −1° C. | +23° C. |
| --- | --- | --- | --- |
| Brookfield viscosity after 1 hour [mPas] |  |  | 90 |
| Brookfield viscosity after 1 day [mPas] | 152 |  | 93 |
| Brookfield viscosity after 2 days [mPas] |  |  | 97 |
| pH after 1 day |  | 5.5 | 5.6 |
| Conductivity after 6 days [mS/cm] |  | 53.1 | 56.4 |

From Table 6 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

Example 9

Inventive Example

This example illustrates the invention and concerns the processing of a suspension comprising calcium carbonate containing material with high dry matter content in combination with hydrochloric acid as strong acid and a medium strong acid. In particular, the hydrochloric acid is added to the calcium carbonate-containing material.

717 g of the 59.3 wt.-% of suspension 4, obtained in Example 4, were placed in a 500 ml glass flask. To this suspension phosphoric acid was slowly dosed under agitation as 85 wt.-% solution at +23° C. over a period of 20 min. The obtained aqueous suspension had solids content of 59.0 wt.-%, based on the total weight of the suspension (suspension 5).

The details regarding the measured Brookfield viscosities (determined at −5° C. and +23° C. and 100 rpm), pH at +23° C. and conductivity can be taken from Table 7.

TABLE 7

|  | −5° C. | +23° C. |
| --- | --- | --- |
| Brookfield viscosity after 1 hour [mPas] |  | 75 |
| Brookfield viscosity after 4 days [mPas] | 62 | 65 |
| pH after 1 hour |  | 4.8 |
| pH after 1 day |  | 5.5 |
| pH after 4 days | 5.97 | 5.7 |
| pH after 3 weeks |  | 5.5 |
| pH after 6 weeks |  | 5.4 |
| Conductivity after 4 days [mS/cm] | 52.4 | 47.7 |

From Table 7 it can be gathered that the inventive high solids aqueous suspension comprising a calcium carbonate-containing material and a medium strong acid as additive shows an unexpected drop of pH to below 6 compared to the prior art suspensions of Examples 1 and 2 and features a low viscosity at −5° C. as well as a good stability in acidic environment over more than 24 hours.

Example 10

Inventive Example

This example illustrates the invention and concerns the application of suspension 5, obtained in Example 9, as coating color in inkjet application.

A polyvinyl alcohol solution (1) was prepared by dissolving 3 g of PVA BP 05 A (Supplier, Chang Chun Petrochemical Co., Ltd, 301 Songkiang Road, 7th Fl., Taipei, Taiwan, 10477) in 15 g deionized water at +90° C. in 20 minutes under agitation.

100 g of the aqueous suspension 5, obtained in Example 9, were mixed under agitation with 18 g of the PVA solution (1). The obtained coating color had solids content of 55 wt.-% based on the total weight of the coating color.

The obtained coating color was applied on 80 g/m² office paper "Centro Pro" hochweiss, holzfrei, matt (Art. No 105570, commercially available from Inapa, Switzerland) in a range of different coat weights (using different rods; rod 0 obtains a coat weight of 10.1 g/m², rod 1 obtains a coat weight of 12.1 g/m²) by using a laboratory coater Typ Model 624 from Ericksen, 58675 Hemer, Germany. The papers were dried for 10 min at +80° C. and conditioned before printing at +23° C., 50% rel. air humidity for 24 hour.

The coatings were tested at +23° C. and 50% rel. air humidity by using a HP color inkjet printer (HP Deskjet 1000, product No CH340B, model No J110a) for black and color (HP Ink Cartridge 301 "black" CH561E and "tri-color" CH562E) on 4×4 cm squares and Rod 0 to Rod 3.

The optical density of the test samples, i.e. coated with the inventive coating color, was compared to non coated blank paper being a 80 g/m² office paper "Centro Pro" hochweiss, holzfrei, matt (Art. No 105570, commercially available from Inapa, Switzerland). The details regarding the measured optical density can be taken from Table 8.

TABLE 8

|  | Prior art blank/no coating | Invention Coat weight | |
| --- | --- | --- | --- |
|  |  | 10.1 g/m² | 12.1 g/m² |
| OD Black*** | 1.89 | 2.54 | 2.59 |
| OD Blue*** | 1.13 | 1.44 | 1.45 |

***Optical density Spectrolino ™, Spectrophotometer, Handheld system

From Table 8 it can be gathered that the coating of the raw paper with the coating color comprising the inventive high solids aqueous suspension shows a clear improvement in color density compared to the non-coated blank paper of the prior art.

Example 11

Inventive Example

This example illustrates the invention and concerns the processing of a suspension comprising calcium carbonate-containing material with high dry matter content in combination with hydrochloric acid as strong acid and aluminium hydroxide. In particular, the hydrochloric acid is added to the calcium carbonate-containing material.

A suspension A was formed by dispersing 70 g $Al(OH)_3$ under agitation in 30 g of tap water. Furthermore, 2 g of a comb polymer having a specific charge of −49 C/g measured at pH 5.9 and −69 C/g measured at pH 8 and an intrinsic viscosity of 30.3 ml/g (MelPers® 2450, available from BASF, Germany) was added. The pH of the suspension A at +23° C. after 1 hour of preparation was 8.4, the Brookfield viscosity after 1 hour and 24 hours of preparation was <1 000 mPas measured at 100 rpm and +23° C.

A suspension B was formed under agitation for 10 minutes by adding 14 g of $AlCl_3 \times 6\ H_2O$ (Fluka, Switzerland Order No. 06232) to suspension A. The obtained aqueous suspension had solids content of 70.1 wt.-%, based on the total weight of the suspension B.

The details regarding the measured Brookfield viscosities (determined at +23° C. and 100 rpm), pH at +23° C. and conductivity can be taken from Table 9.

TABLE 9

|  | +23° C. |
|---|---|
| Brookfield viscosity after 1 hour [mPas] | <1 000 |
| Brookfield viscosity after 1 day [mPas] | <1 000 |
| pH after 10 min | 0.70 |
| pH after 1 hour | 1.40 |
| pH after 1 day | 1.67 |
| Conductivity after 1 days [mS/cm] | 46.3 |

100 g of the 59 wt.-% of suspension 5, obtained in Example 9, were placed in a 200 ml glass flask. To this aqueous suspension, 100 g of suspension B were slowly added under agitation at +23° C. over a period of 60 min. The obtained aqueous suspension had solids content of 62.9 wt.-%, based on the total weight of the suspension.

The details regarding the measured Brookfield viscosities (determined at −5° C. and +23° C. and 100 rpm), pH at +23° C. and conductivity can be taken from Table 10.

TABLE 10

|  | −5° C. | +23° C. |
|---|---|---|
| Brookfield viscosity after 1 hour [mPas] |  | 288 |
| Brookfield viscosity after 6 hours [mPas] |  | 344 |
| Brookfield viscosity after 10 days [mPas] | <700 | <700 |
| pH after 1 hour |  | 4.2 |
| pH after 6 hours |  | 4.6 |
| pH after 10 days |  | 4.5 |

From Table 10 it can be gathered that the inventive high solids aqueous suspension comprising a calcium carbonate-containing material and aluminium hydroxide as additive shows an unexpected drop of pH to below 6 compared to the prior art suspensions of Examples 1 and 2 and features a low viscosity at −5° C. as well as a good stability in acidic environment over more than 24 hours.

Example 12

Inventive Example

This example illustrates the invention and concerns the processing of a suspension comprising a calcium carbonate-containing material with high dry matter content in combination with a calcium salt of hydrochloric acid. In particular, the calcium salt of hydrochloric acid is added to the calcium carbonate-containing material.

315 g of the 76 wt.-% of suspension 3, having a pH of 7.9 at +23° C., was placed in a stirred 250 ml glass backer at +23° C. To this suspension 31.7 g $CaCl_2 \times 2\ H_2O$ were added under agitation in 5 minutes. The goal was to add in total 23.9 g of the calcium salt of hydrochloric acid. The obtained aqueous suspension had solids content of 75.5 wt.-%, based on the total weight of the suspension.

The details regarding the measured Brookfield viscosities (determined at −5° C. and +23° C. and 100 rpm), pH at +23° C. and conductivity at +23° C. can be taken from Table 11.

TABLE 11

|  | at Temp. of: | |
|---|---|---|
|  | −5° C. | +23° C. |
| Brookfield viscosity after 6 hour [mPas] | 45 | 45 |
| pH after 1 hour |  | 4.6 |
| pH after 1 day |  | 4.8 |
| pH after 7 day |  | 4.9 |
| Conductivity after 1 hour [mS/cm] |  | 64.6 |

From Table 11 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

In comparison reasons, 31.7 g $CaCl_2 \times 2\ H_2O$ were dissolved in 75 g water under agitation. The goal was to have approximately the same concentration of the calcium salt of hydrochloric acid as in the liquid phase of the suspension of this example as described above. The details regarding the measured pH at +23° C. and conductivity at +23° C. can be taken from Table 12

TABLE 12

|  | at Temp. of: |
|---|---|
|  | +23° C. |
| pH after 1 hour | 9.4 |
| pH after 7 day | 9.2 |
| Conductivity after 1 hour [mS/cm] | 61.1 |

From the details set out in Table 11 versus Table 12, it can be gathered that totally surprising the inventive high solids aqueous suspension comprising a calcium carbonate-containing material has a stable acidic pH of far below 6 at +23° C. combining an alkaline suspension of calcium carbonate having a pH of 8.4 with an alkaline solution of calcium salt of hydrochloric acid having a pH of about 9.4 (as outlined in Table 12).

Example 13

Inventive Example

This example illustrates the invention and concerns the processing of a suspension comprising a calcium carbonate-containing material with high dry matter content in combination with a calcium salt of nitric acid. In particular, the calcium salt of nitric acid is added to the calcium carbonate-containing material.

500 g of the 76 wt.-% of suspension 3 was placed in a stirred 1 000 ml glass backer at +23° C. To this suspension 54 g Ca(NO$_3$)$_2$×4 H$_2$O were added under agitation in 5 minutes. The goal was to add in total 37.5 g of the calcium salt of nitric acid. The obtained aqueous suspension had solids content of 75.3 wt.-%, based on the total weight of the suspension.

The details regarding the measured Brookfield viscosities (determined at −5° C. and +23° C. and 100 rpm), pH at +23° C. and conductivity at +23° C. can be taken from Table 13.

TABLE 13

|  | at Temp. of: | |
| --- | --- | --- |
|  | −5° C. | +23° C. |
| Brookfield viscosity after 6 hour [mPas] | 55 | 65 |
| pH after 1 hour |  | 5.5 |
| pH after 1 day |  | 5.8 |
| Conductivity after 1 hour [mS/cm] |  | 34.6 |

From Table 13 it can be gathered that the inventive high solids aqueous suspension comprising a calcium carbonate-containing material shows an unexpected drop of pH to below 6 compared to the prior art suspensions of Examples 1 and 2 and features a low viscosity at −5° C. as well as a good stability in acidic environment over more than 24 hours.

Example 14

Inventive Example

This example illustrates the invention and concerns the processing of a suspension comprising a calcium carbonate in combination with a solution comprising a calcium salt of hydrochloric acid. In particular, the calcium salt of hydrochloric acid is added to the calcium carbonate-containing material.

70 g CaCO$_3$ (Fluka) were dispersed under agitation in 70 ml distilled water to form a suspension of CaCO$_3$. Into this suspension 1.5 g Melpers 4343 (available from BASF, Germany), in form of a 50 wt.-% solution (BASF), based on the total weight of the solution, were added. The obtained suspension had a pH of 7.5 at +23° C. Into this suspension, 3 g CaCl$_2$ (Fluka) were dosed under agitation to form a CaCO$_3$ suspension comprising CaCl$_2$. Subsequently, further 4 g CaCl$_2$ (Fluka) were dosed under agitation into the suspension to form a CaCO$_3$ suspension comprising CaCl$_2$.

The details regarding the measured pH at +23° C. can be taken from Table 14.

TABLE 14

|  | at Temp. of: +23° C. |
| --- | --- |
| pH after 1 hour | 5.4 |
| pH after 5 days | 5.9 |

As can be gathered from the details regarding the measured pH, an unexpected drop of pH to below 6 at +23° C. was observed.

The invention claimed is:

1. A high solids aqueous mineral and/or filler and/or pigment suspension in acidic pH environment comprising:
   a) at least one calcium carbonate-containing material comprising calcium carbonate-containing particles, and
   b) at least one salt of at least one strong acid, wherein the at least one strong acid forming the at least one salt of at least one strong acid is selected from the group consisting of acids having a pK$_a$ value of less than or equal to zero at +23° C.,
   wherein the high solids aqueous suspension has
   i) a solids content of at least 50 wt.-%, based on the total weight of the high solids aqueous suspension,
   ii) a Brookfield viscosity at 100 rpm of ≤1000 mPas at a temperature of −5° C.,
   iii) a pH of <6 at +23° C., and
   iv) a conductivity of between 10 and 100 mS/cm at −5° C. and at +23° C.

2. The high solids aqueous mineral and/or filler and/or pigment suspension of claim 1, wherein the calcium carbonate-containing particles of the at least one calcium carbonate-containing material are selected from among natural calcium carbonate, precipitated calcium carbonate or mixtures thereof.

3. The high solids aqueous mineral and/or filler and/or pigment suspension of claim 1, wherein the calcium carbonate-containing particles of the at least one calcium carbonate-containing material have a weight median particle size d$_{50}$ from 0.1 to 50 μm.

4. The high solids aqueous mineral and/or filler and/or pigment suspension of claim 1, wherein the calcium carbonate-containing particles of the at least one calcium carbonate-containing material have a weight median particle size d$_{50}$ from 0.3 to 5 μm.

5. The high solids aqueous mineral and/or filler and/or pigment suspension of claim 1, wherein the calcium carbonate-containing particles of the at least one calcium carbonate-containing material have a specific surface area of from 0.1 m$^2$/g to 200 m$^2$/g measured using nitrogen and the BET method.

6. The high solids aqueous mineral and/or filler and/or pigment suspension of claim 1, wherein the calcium carbonate-containing particles of the at least one calcium carbonate-containing material have a specific surface area of from 0.1 m$^2$/g to 50 m$^2$/g measured using nitrogen and the BET method.

7. The high solids aqueous mineral and/or filler and/or pigment suspension of claim 1, wherein the calcium carbonate-containing particles of the at least one calcium carbonate-containing material have a specific surface area of from 0.1 m$^2$/g to 20 m$^2$/g measured using nitrogen and the BET method.

8. The high solids aqueous mineral and/or filler and/or pigment suspension of claim 1, wherein the high solids aqueous suspension comprises the at least one calcium carbonate-containing material in an amount of at least 50 wt.-% based on the total weight of the high solids aqueous suspension.

9. The high solids aqueous mineral and/or filler and/or pigment suspension of claim 1, wherein the high solids aqueous suspension comprises the at least one calcium carbonate-containing material in an amount of from 50 to 82 wt.-% based on the total weight of the high solids aqueous suspension.

10. The high solids aqueous mineral and/or filler and/or pigment suspension of claim 1, wherein the at least one calcium carbonate-containing material comprises at least one comb polymer.

11. The high solids aqueous mineral and/or filler and/or pigment suspension of claim 1, wherein the surface of the calcium carbonate-containing particles of the at least one calcium carbonate-containing material are coated with at least one comb polymer.

12. The high solids aqueous mineral and/or filler and/or pigment suspension of claim 1, wherein the at least one calcium carbonate-containing material comprises at least one comb polymer having an intrinsic viscosity in the range of 5 to 99 ml/g.

13. The high solids aqueous mineral and/or filler and/or pigment suspension of claim 1, wherein the at least one calcium carbonate-containing material comprises at least one comb polymer having an intrinsic viscosity in the range of 10 to 80 ml/g.

14. The high solids aqueous mineral and/or filler and/or pigment suspension of claim 1, wherein the at least one salt of at least one strong acid comprises a divalent and/or trivalent cation.

15. The high solids aqueous mineral and/or filler and/or pigment suspension of claim 14, wherein the divalent cation is selected from the group consisting of calcium, magnesium, strontium and mixtures thereof.

16. The high solids aqueous mineral and/or filler and/or pigment suspension of claim 14, wherein the trivalent cation is aluminum.

17. The high solids aqueous mineral and/or filler and/or pigment suspension of claim 1, wherein the at least one salt of at least one strong acid comprises a divalent and a trivalent cation, wherein the divalent cation is selected from the group consisting of calcium, magnesium, strontium and mixtures thereof, and wherein the trivalent cation is aluminum.

18. The high solids aqueous mineral and/or filler and/or pigment suspension of claim 1, wherein the at least one strong acid forming the at least one salt of at least one strong acid is selected from the group consisting of hydrochloric acid, nitric acid and mixtures thereof.

19. The high solids aqueous mineral and/or filler and/or pigment suspension of claim 1, wherein the high solids aqueous suspension comprises at least one comb polymer in an amount from 0.01 to 5 wt.-% based on the total dry weight of the calcium carbonate-containing material in the suspension.

20. The high solids aqueous mineral and/or filler and/or pigment suspension of claim 1, wherein the high solids aqueous suspension comprises at least one comb polymer in an amount from 0.1 to 3 wt.-% based on the total dry weight of the calcium carbonate-containing material in the suspension.

21. The high solids aqueous mineral and/or filler and/or pigment suspension of claim 1, wherein the high solids aqueous suspension has solids content from 50 to 82 wt.-% based on the total weight of the high solids aqueous suspension.

22. The high solids aqueous mineral and/or filler and/or pigment suspension of claim 1, wherein the high solids aqueous suspension has solids content from 60 to 78 wt.-% based on the total weight of the high solids aqueous suspension.

23. The high solids aqueous mineral and/or filler and/or pigment suspension of claim 1, wherein the high solids aqueous suspension has a Brookfield viscosity at 100 rpm from 25 to 1,000 mPas at a temperature of $-5°$ C.

24. The high solids aqueous mineral and/or filler and/or pigment suspension of claim 1, wherein the high solids aqueous suspension has a Brookfield viscosity at 100 rpm from 25 to 700 mPas at a temperature of $-5°$ C.

25. The high solids aqueous mineral and/or filler and/or pigment suspension of claim 1, wherein the high solids aqueous suspension has a Brookfield viscosity at 100 rpm from 25 to 500 mPas at a temperature of $-5°$ C.

26. The high solids aqueous mineral and/or filler and/or pigment suspension of claim 1, wherein the high solids aqueous suspension has a Brookfield viscosity at 100 rpm from 50 to 300 mPas at a temperature of $-5°$ C.

27. The high solids aqueous mineral and/or filler and/or pigment suspension of claim 1, wherein the high solids aqueous suspension has a pH of between 4 and <6 at $+23°$ C.

28. The high solids aqueous mineral and/or filler and/or pigment suspension of claim 1, wherein the high solids aqueous suspension has a pH of between 4.5 and <6 at $+23°$ C.

29. The high solids aqueous mineral and/or filler and/or pigment suspension of claim 1, wherein the high solids aqueous suspension has a pH of between 5 and <6 at $+23°$ C.

30. The high solids aqueous mineral and/or filler and/or pigment suspension of claim 1, wherein the high solids aqueous suspension has a conductivity of between 20 mS/cm and 100 mS/cm measured at $-5°$ C. and $+23°$ C.

31. The high solids aqueous mineral and/or filler and/or pigment suspension of claim 1, wherein the high solids aqueous suspension has a conductivity of between 30 mS/cm and 100 mS/cm measured at $-5°$ C. and $+23°$ C.

32. The high solids aqueous mineral and/or filler and/or pigment suspension of claim 1, wherein the high solids aqueous suspension further comprises at least one reaction product or products of the at least one calcium carbonate-containing material with at least one medium strong acid and/or at least one reaction product or products of the at least one calcium carbonate-containing material with at least one weak acid.

33. The high solids aqueous mineral and/or filler and/or pigment suspension of claim 32, wherein the at least one medium strong acid forming the at least one reaction product or products of the at least one calcium carbonate-containing material is an acid having a $pK_a$ value of between 0 and 2.5 at $+23°$ C.

34. The high solids aqueous mineral and/or filler and/or pigment suspension of claim 33, wherein the at least one medium strong acid is selected from the group consisting of $H_2SO_3$, $HSO_4$—, $H_3PO_4$, oxalic acid and mixtures thereof.

35. The high solids aqueous mineral and/or filler and/or pigment suspension of claim 32, wherein the at least one weak acid forming the at least one reaction product or products of the at least one calcium carbonate-containing material is an acid having a $pK_a$ value of between >2.5 and 6 at $+23°$ C.

36. The high solids aqueous mineral and/or filler and/or pigment suspension of claim 35, wherein the at least one weak acid is selected from the group consisting of citric acid, tartaric acid and mixtures thereof.

37. The high solids aqueous mineral and/or filler and/or pigment suspension of claim 1, wherein the molar quantity of the sum, expressed by the generated $H_3O^+$ ions, of the at least one medium strong acid forming the at least one reaction product or products of the at least one calcium carbonate-containing material and/or the at least one weak acid forming the at least one reaction product or products of the at least one calcium carbonate-containing material and the at least one strong acid forming the at least one salt of at least one strong acid relative to the quantity of moles of $CaCO_3$ is in total between 0.01 and 1.9.

38. The high solids aqueous mineral and/or filler and/or pigment suspension of claim 1, wherein the high solids aqueous suspension further comprises aluminum hydroxide and/or magnesium hydroxide.

39. The high solids aqueous mineral and/or filler and/or pigment suspension of claim 1, wherein the high solids aqueous suspension has a positive charge density at pH 5.

40. The high solids aqueous mineral and/or filler and/or pigment suspension of claim 1, wherein the high solids aqueous suspension has a positive charge density of at least +0.1 C/g at pH 5.

41. The high solids aqueous mineral and/or filler and/or pigment suspension of claim 1, wherein the high solids aqueous suspension has a positive charge density of at least +0.5 C/g at pH 5.

42. The high solids aqueous mineral and/or filler and/or pigment suspension of claim 1, wherein the high solids aqueous suspension has a positive charge density of at least +1 C/g at pH 5.

43. The high solids aqueous mineral and/or filler and/or pigment suspension of claim 1, wherein the high solids aqueous suspension has a positive charge density of at least +1.5 C/g at pH 5.

44. A calcium carbonate-containing material obtainable by drying the high solids aqueous mineral and/or filler and/or pigment suspension of claim 1.

45. A paper, paper coating, plastic, agricultural product or paint comprising the high solids aqueous mineral and/or filler and/or pigment suspension of claim 1 or calcium carbonate-containing material dried therefrom.

46. A paper filler comprising the high solids aqueous mineral and/or filler and/or pigment suspension of claim 1 or calcium carbonate-containing material dried therefrom.

47. A support for printing comprising the high solids aqueous mineral and/or filler and/or pigment suspension of claim 1 or calcium carbonate-containing material dried therefrom, for digital printing, for ink jet printing, or for flexo, rotogravure and/or offset printing.

48. A coating color formulation comprising the high solids aqueous mineral and/or filler and/or pigment suspension of claim 1 or calcium carbonate-containing material dried therefrom, and a natural and/or synthetic binder.

49. The coating color formulation of claim 48, wherein the binder contains or consists of styrene-butadiene, styrene-acrylate, polyvinyl acetate, polyvinyl alcohol, starch or mixtures thereof.

50. A method for producing a high solids aqueous mineral and/or filler and/or pigment suspension as defined in claim 1, comprising the steps of
a) providing an aqueous suspension comprising at least one calcium carbonate-containing material, wherein the calcium carbonate-containing material has a charge density of between +2 and −2 C/g at pH 9,
b) providing
  i) at least one strong acid selected from the group consisting of acids having a $pK_a$ value of less than or equal to zero at +23° C., and/or
  ii) at least one salt of at least one strong acid, wherein the at least one strong acid forming the at least one salt of at least one strong acid is selected from the group consisting of acids having a $pK_a$ value of less than or equal to zero at +23° C.,
c) adding the at least one strong acid and/or the at least one salt of at least one strong acid of step b) to the aqueous suspension comprising at least one calcium carbonate-containing material of step a),
d) optionally grinding the aqueous suspension comprising at least one calcium carbonate-containing material of step a) before and/or during and/or after step c),
wherein the high solids aqueous suspension after step c) and/or d) has
  i) a solids content of at least 50 wt.-%, based on the total weight of the high solids aqueous suspension,
  ii) a Brookfield viscosity at 100 rpm of ≤1 000 mPas at a temperature of −5° C.,
  iii) a pH of <6 at +23° C., and
  iv) a conductivity of between 10 and 100 mS/cm at −5° C. and at +23° C.

51. The method of claim 50, wherein the method further comprises step e) of providing at least one medium strong acid selected from the group consisting of acids having a $pK_a$ value of between 0 and 2.5 at +23° C., and/or at least one weak acid selected from the group consisting of acids having a $pK_a$ value of between >2.5 to 6.0 at +23° C.

52. The method of claim 51, wherein the at least one medium strong acid is selected from the group consisting of $H_2SO_3$, $HSO_4^-$, $H_3PO_4$, oxalic acid and mixtures thereof.

53. The method of claim 51, wherein the at least one weak acid is citric acid and/or tartaric acid.

54. The method of claim 51, wherein the method further comprises step f) of contacting the aqueous suspension comprising at least one calcium carbonate-containing material of step a) with the at least one medium strong acid and/or at least one weak acid of step e) during and/or after step c), and/or during and/or after optional step d).

55. The method of claim 54, wherein step c) and/or step d) and/or step f) is carried out at a temperature of between +5° C. and +99° C.

56. The method of claim 50, wherein the method further comprises concentrating and/or drying the obtained high solids aqueous mineral and/or filler and/or pigment suspension.

* * * * *